United States Patent
Ikemoto

(10) Patent No.: US 10,600,195 B2
(45) Date of Patent: Mar. 24, 2020

(54) DEPTH DETECTION APPARATUS AND DEPTH DETECTION METHOD

(71) Applicant: CANON KABUSHIKI KAISHA, Tokyo (JP)

(72) Inventor: Kiyokatsu Ikemoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 330 days.

(21) Appl. No.: 15/787,963

(22) Filed: Oct. 19, 2017

(65) Prior Publication Data

US 2018/0114327 A1 Apr. 26, 2018

(30) Foreign Application Priority Data

Oct. 24, 2016 (JP) ................. 2016-207805

(51) Int. Cl.
*G06T 7/55* (2017.01)
*G06T 7/521* (2017.01)
*G06T 7/593* (2017.01)

(52) U.S. Cl.
CPC ............ *G06T 7/55* (2017.01); *G06T 7/521* (2017.01); *G06T 7/593* (2017.01)

(58) Field of Classification Search
CPC ........... G06T 7/55; G06T 7/593; G06T 7/521; G06T 7/70; G06T 7/97; H04N 5/23212; H04N 9/045; H04N 5/3696; H04N 5/3745; H04N 2209/045; G01C 3/32
See application file for complete search history.

(56) References Cited

U.S. PATENT DOCUMENTS

| 5,367,153 | A | 11/1994 | Suda et al. |
| 5,839,003 | A * | 11/1998 | Iwane ................ G02B 7/28 396/102 |
| 9,275,078 | B2 * | 3/2016 | Bhardwaj .......... G06K 9/00208 |
| 2003/0001837 | A1 * | 1/2003 | Baumberg .............. G06T 15/20 345/419 |
| 2015/0063681 | A1 * | 3/2015 | Bhardwaj .......... G06K 9/00208 382/154 |
| 2015/0109514 | A1 * | 4/2015 | Komatsu .................. G02B 7/38 348/349 |

(Continued)

FOREIGN PATENT DOCUMENTS

| JP | 3240648 B2 | 12/2001 |
| JP | 3675039 B2 | 7/2005 |

*Primary Examiner* — Lin Ye
*Assistant Examiner* — Tuan H Le
(74) *Attorney, Agent, or Firm* — Cowan, Liebowitz & Latman, P.C.

(57) ABSTRACT

Provided is a depth detection apparatus for detecting depth information from a first and a second image based on a light flux passing through different pupil regions, the apparatus including an image generator that generates a third and a fourth image by subjecting the first and the second image to a filter, a depth detector that detects depth information from a relative positional shift amount between the third and the fourth image, a representative value acquirer that acquires a representative value of spatial frequencies of the third or the fourth image from a frequency characteristic of the filter, and a confidence determiner that determines confidence for the depth information from the representative value. The confidence is determined as a value representing higher confidence as the representative value is greater.

20 Claims, 13 Drawing Sheets

(56) References Cited

U.S. PATENT DOCUMENTS

2015/0235103 A1\* 8/2015 Komatsu ................ G06T 7/593
  382/195
2016/0125611 A1\* 5/2016 Komatsu ................... G06T 7/55
  348/135

\* cited by examiner

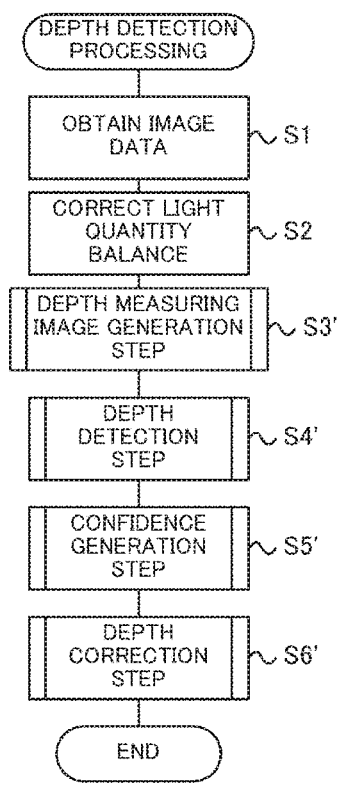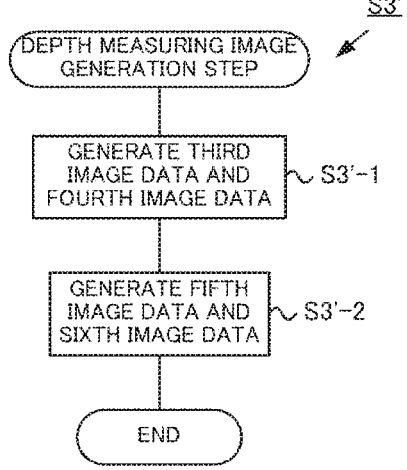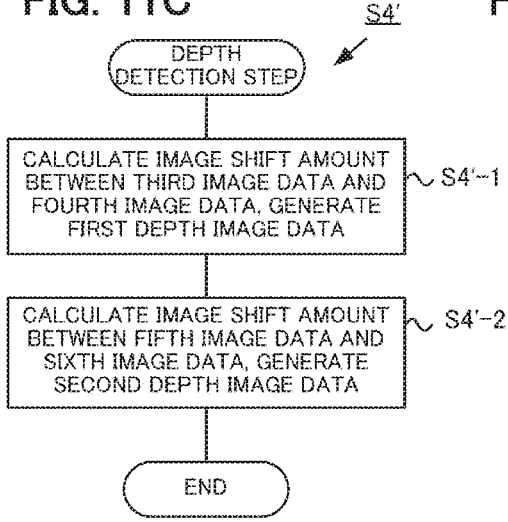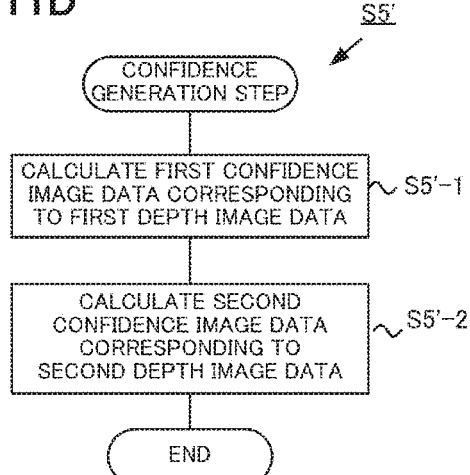

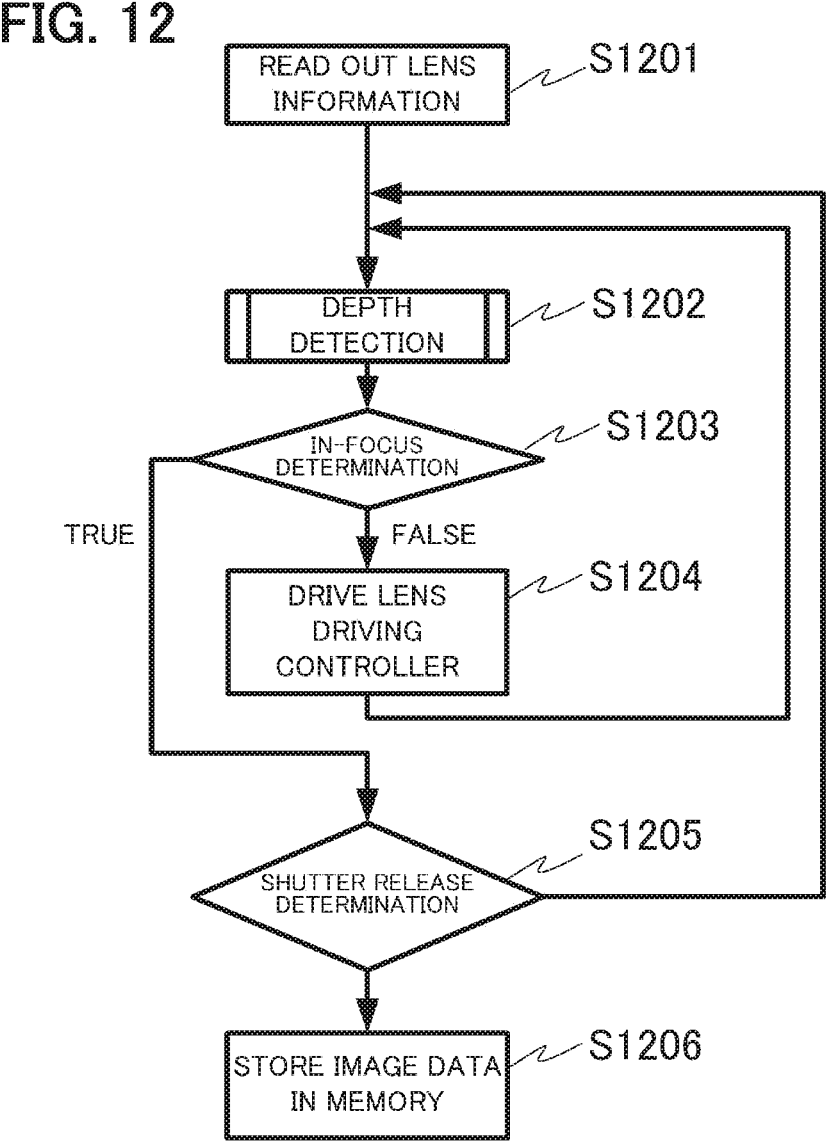

DEPTH DETECTION APPARATUS AND DEPTH DETECTION METHOD

BACKGROUND OF THE INVENTION

Field of the Invention

The present invention relates to a depth detection apparatus, and more particularly, to a depth detection apparatus for use in a digital camera, a digital video camera or the like.

Description of the Related Art

According to a known technique, in a digital still camera or a digital video camera, pixels each having a depth measuring function (hereinafter also referred to as "depth measuring pixels") are disposed in part or all of an image sensing device, and the depth to an object is detected by phase difference detection.

In such a method, a plurality of photoelectric converters are disposed in the depth measuring pixels, so that a light flux passing through different regions on the lens pupil of an imaging lens is guided into different photoelectric converters. Optical images (hereinafter referred to as an "image A" and an "image B") generated by the light flux passing through the different pupil regions can be obtained on the basis of signals output by the photoelectric converters included in the depth measuring pixels, and a plurality of images can be obtained on the basis of the image A and the image B. Note that the pupil region corresponding to the image A and the pupil region corresponding to the image B are eccentric from the center of the pupil in different directions from each other along an axis called a pupil dividing direction.

A relative positional shift is generated according to a defocus amount in the pupil dividing direction between the plurality of images (hereinafter as the "image A" and the "image B") obtained using the depth measuring pixels. The positional shift is called an image shift, and the amount of image shift is called an image shift amount. The depth to the object can be obtained by converting the image shift amount into a defocus amount through a prescribed conversion coefficient. The method allows highly accurate depth measurement to be achieved at high speed unlike a conventional contrast method which requires movement of a lens for measuring the depth.

In general, a region-based corresponding point search technique called template matching is used to obtain the image shift amount. In the template matching, the image A or the image B is set as a standard image and the other image is set as a reference image. A local region (hereinafter as a comparison region) around an attention point is set on the standard image, and a comparison region around a reference point corresponding to the attention point is set on the reference image. The point having the highest correlation (i.e., similarity) between the image A and the image B in the comparison region is searched for while sequentially moving the reference point. The image shift amount is produced on the basis of the relative positional shift amount between the point and the attention point.

When the image shift amount is produced using the template matching, a large calculation error for the image shift amount may be caused by a spatial frequency included in the images. For example, if the spatial frequency of an image is low, change in the pixel value within the template is small, a corresponding point cannot be calculated accurately, and a calculation error for the image shift amount may be significant.

In order to solve the problem, a device disclosed in Japanese Patent No. 3675039 calculates the depth to an object on the basis of a stereo image, and confidence for the calculated depth is used. Japanese Patent No. 3675039 discloses the use of a contrast change amount or a spatial frequency distribution in an image as the confidence.

When the confidence based only on the contrast change amount as disclosed in Japanese Patent No. 3675039 is used, the influence of the spatial frequency is not taken into consideration, the confidence is not accurate enough, and a region with low depth calculation accuracy may be determined as having high confidence. Japanese Patent No. 3675039 does not disclose a specific method for calculating a spatial frequency distribution when confidence in consideration of the spatial frequency distribution of an image is used. If the spatial frequency distribution is calculated by the Fourier transform of an image, a calculation load would be increased, and an increased time period would be necessary for calculating the confidence. Furthermore, Japanese Patent No. 3675039 does not disclose a specific method for calculating confidence on the basis of a spatial frequency distribution, and it would be difficult to determine confidence for a calculated depth with high accuracy.

SUMMARY OF THE INVENTION

With the foregoing in view, an object of the present invention is to provide a depth detection apparatus that detects a depth to an object on the basis of an image shift amount, so that confidence for the detected depth can be determined with high accuracy.

A depth detection apparatus according to one aspect of the present invention detects depth information from a first image and a second image based on a light flux passing through different pupil regions of an image forming optical system, and includes an image generator configured to generate a third image and a fourth image by subjecting the first image and the second image to a filter, a depth detector configured to detect depth information on the basis of a relative positional shift amount between the third image and the fourth image, a representative value acquirer configured to acquire a representative value of spatial frequencies of the third image or the fourth image on the basis of a frequency characteristic of the filter, and a confidence determiner configured to determine confidence for the depth information on the basis of the representative value, the confidence being determined as a value representing higher confidence as the representative value is greater.

A depth detection apparatus according to another aspect of the present invention detects depth information from two images based on a light flux passing through different pupil regions of an image forming optical system, and includes a depth detector configured to detect the depth information on the basis of the two images, a representative value acquirer configured to acquire a representative value of spatial frequencies in one of the two images, and a confidence determiner configured to determine confidence for the depth information on the basis of the representative value, the confidence being determined as a value representing higher confidence as the representative value is greater.

A depth detection method according to one aspect of the present invention is carried out by a depth detection apparatus for detecting depth information from a first image and a second image based on a light flux passing through different pupil regions of an image forming optical system, and includes an image generation step of generating a third image and a fourth image by subjecting the first image and the second image to a filter, a depth detection step of detecting depth information on the basis of a positional shift amount between the third image and the fourth image, a representative value acquiring step of acquiring a representative value of spatial frequencies of the third image or the fourth image on the basis of a frequency characteristic of the filter, and confidence determination step of determining confidence for the depth information on the basis of the representative value, the confidence being determined as a value representing higher confidence as the representative value is greater.

A depth detection method according to yet another aspect of the present invention is carried out by a depth detection apparatus for detecting depth information from two images based on a light flux passing through different pupil regions of an image forming optical system, and includes a depth detection step of detecting depth information on the basis of the two images, a representative value acquiring step of acquiring a representative value of spatial frequencies in one of the two images, and a confidence determination step of determining confidence for the depth information on the basis of the representative value, the confidence being determined as a value representing higher confidence as the representative value is greater.

According to the present invention, in a depth detection apparatus that detects the depth to an object on the basis of an image shift amount, confidence for a detected depth can be determined with high accuracy.

Further features of the present invention will become apparent from the following description of exemplary embodiments with reference to the attached drawings.

BRIEF DESCRIPTION OF THE DRAWINGS

FIGS. 11A to 11D are flowcharts for processing in the third embodiment; and

FIG. 12 is a flowchart for illustrating an operation example of the digital camera according to the embodiment.

DESCRIPTION OF THE EMBODIMENTS

First Embodiment

Figure 1A:
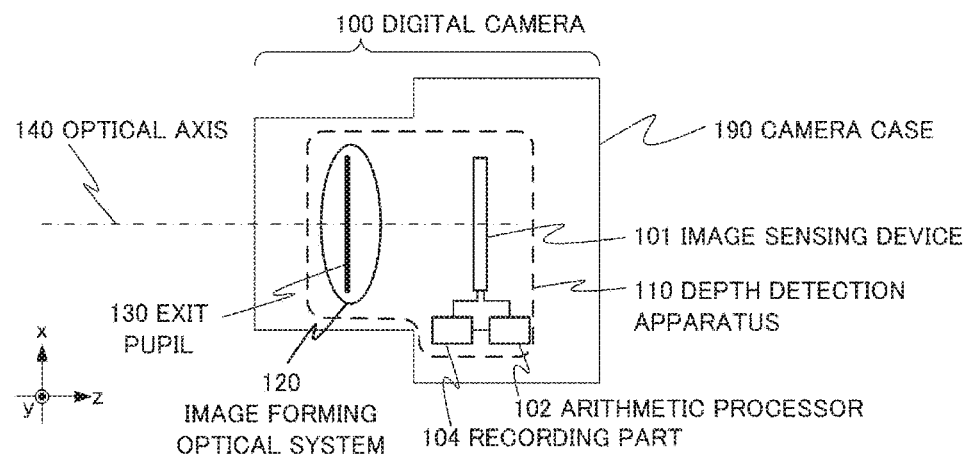
FIGS. 1A to 1D are diagrams and views for illustrating a digital camera including a depth detection apparatus according to a first embodiment.

Now, a first embodiment of the present invention will be described in detail with reference to the accompanying drawings.

In the following, a digital camera will be described as an example of a device including a depth calculation apparatus according to the present invention, but the application of the present invention is not limited to a digital camera. For example, the depth detection apparatus according to the present invention may be applied to a digital distance measuring device.

Note that in the following description in conjunction with the drawings, the same portions will be denoted in principle by the same reference characters among different figures, and their description will not be repeated wherever possible.

<Configuration of Digital Camera>

FIG. 1A shows a digital camera 100 including a depth detection apparatus 110 according to the embodiment. The digital camera 100 is configured by disposing, in a camera case 190, an image forming optical system 120, an image sensing device 101, the depth detection apparatus 110, an image generator (not shown), and a lens driving controller (not shown). The depth detection apparatus 110 includes the image forming optical system 120, the image sensing device 101, an arithmetic processor 102, and a recording part 104. The arithmetic processor 102 may include a logic circuit. Alternatively, the arithmetic processor 102 may include a central processing unit (CPU) and a memory that stores arithmetic processing programs.

Figure 1B:
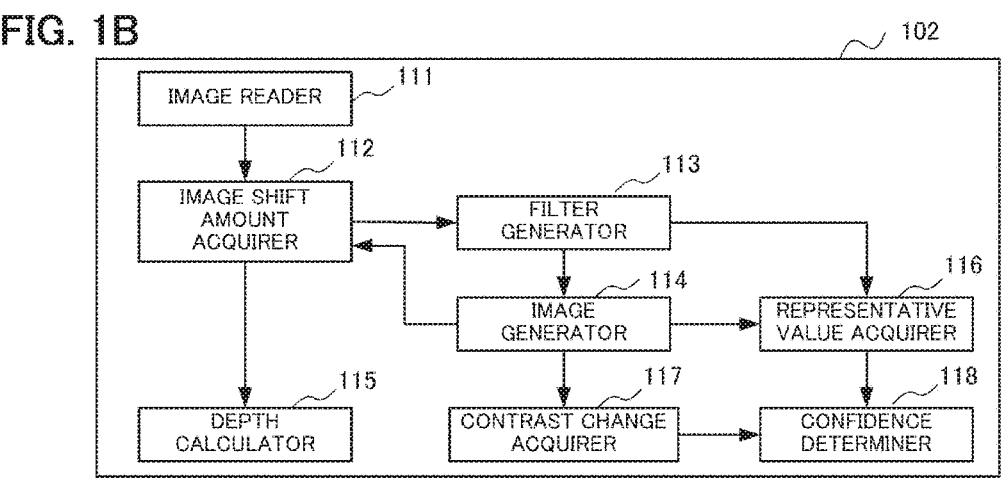

FIG. 1B shows a functional part of the arithmetic processor 102. As the functional part, the arithmetic processor 102 has an image reader 111, an image shift amount acquirer 112, a filter generator 113, an image generator 114, a depth calculator 115, a representative value acquirer 116, a contrast change acquirer 117, and a confidence determiner 118. The arithmetic processor 102 has a functional part that subjects an image to preprocessing for depth detection and processing other than depth detection but the part is not shown. The functional parts will be described in detail.

The image forming optical system 120 is the photographic lenses of the digital camera 100 and capable of forming an image of an object at the image sensing device 101 as an image sensing surface. The image forming optical system 120 includes a plurality of lens groups (not shown) and a diaphragm (not shown) and has an exit pupil 130 positioned a prescribed distance apart from the image sensing device 101. Note that reference numeral 140 in FIG. 1A represents the optical axis of the image forming optical system 120, and the optical axis 140 herein is parallel to the z-axis. The x-axis and the y-axis are orthogonal to each other and also orthogonal to the optical axis.

Now, an operation example of the digital camera 100 will be described with reference to FIG. 12. The following description is only by way of illustration. FIG. 12 is a flow chart for illustrating operation after the main power supply of the digital camera 100 is turned on and a shutter button (not shown) is pressed in a so-called halfway state. In step 1201, information of the image forming optical system 120 (such as the focal length and the stop value) is read out and stored in the memory (not shown). Then, the focal point is adjusted by carrying out processing in steps 1202, 1203, and

1204. More specifically, in step 1202, a defocus amount and confidence are calculated on the basis of image data output from the image sensing device 101 using a depth detection procedure that will be described with reference to FIG. 3. It is determined in step 1203 whether the image forming optical system 120 is in an in-focus state on the basis of the calculated defocus amount and confidence. If not in an in-focus state, the image forming optical system 120 is driven to the in-focus position by the lens driving controller on the basis of the defocus amount in step 1204, and the process returns to step 1202. If it is determined in step 1203 that an in-focus state is attained, it is determined in step 1205 whether the shutter is released (so-called fully pressed) by operation of the shutter button (not shown). If it is determined that the shutter is not released, the process returns to step 1202, and the above processing is repeated. If it is determined in step 1205 that the shutter is released, image data is read from the image sensing device 101 and stored in the recording part 104. The image generator subjects the image data stored in the recording part 104 to development, so that image data for appreciation can be generated. The depth detection procedure that will be described with reference to FIG. 3 maybe applied to the image data stored in the recording part 104, so that object depth image data (object depth distribution) and confidence image data corresponding to the image for appreciation can be generated.

<Configuration of Image Sensing Device>

The image sensing device 101 includes a complementary metal-oxide-semiconductor (CMOS) or a charge-coupled device (CCD). An object image formed on the image sensing device 101 through the image forming optical system 120 is photoelectrically converted by the image sensing device 101, and image data on the basis of the object image is generated. The image sensing device 101 according to the embodiment will be described in detail with reference to FIG. 1C.

Figure 1C:
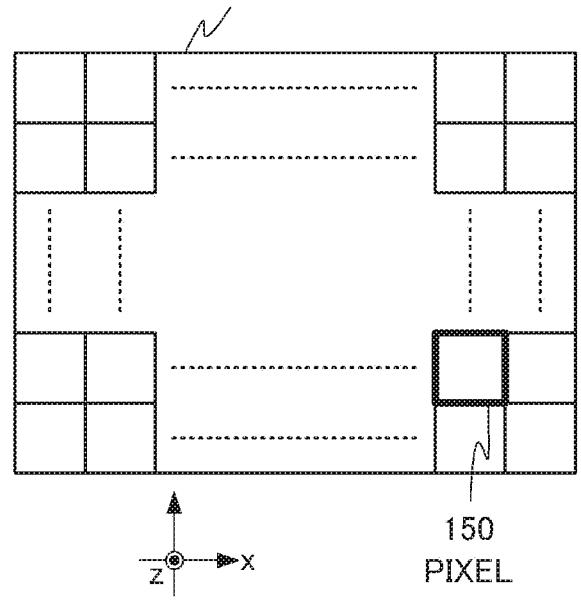

FIG. 1C is an x-y sectional view of the image sensing device 101. The image sensing device 101 includes an arrangement of a plurality of pixels 150.

Figure 1D:
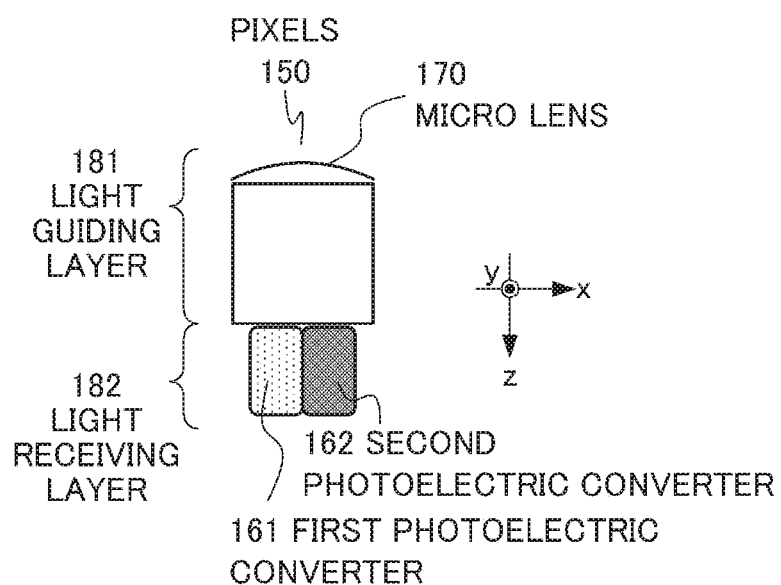

FIG. 1D is a schematic view of an X-Z section of the pixel 150. The pixel 150 includes a light receiving layer 182 and a light guiding layer 181. Two photoelectric converters (a first photoelectric converter 161 and a second photoelectric converter 162) for photoelectrically converting received light are disposed in the light receiving layer 182. In the light guiding layer 181, for example, a micro lens 170 for efficiently guiding a light flux entering the pixel to the photoelectric converters, a color filter (not shown) that passes light in a prescribed wavelength band, and interconnections (not shown) for reading out an image and driving the pixel, are disposed.

<Description of Principles of Depth Measurement>

A light flux received by the first photoelectric converter 161 and the second photoelectric converter 162 provided in the image sensing device 101 according to the embodiment will be described with reference to FIGS. 2A and 2B.

Figure 2A:
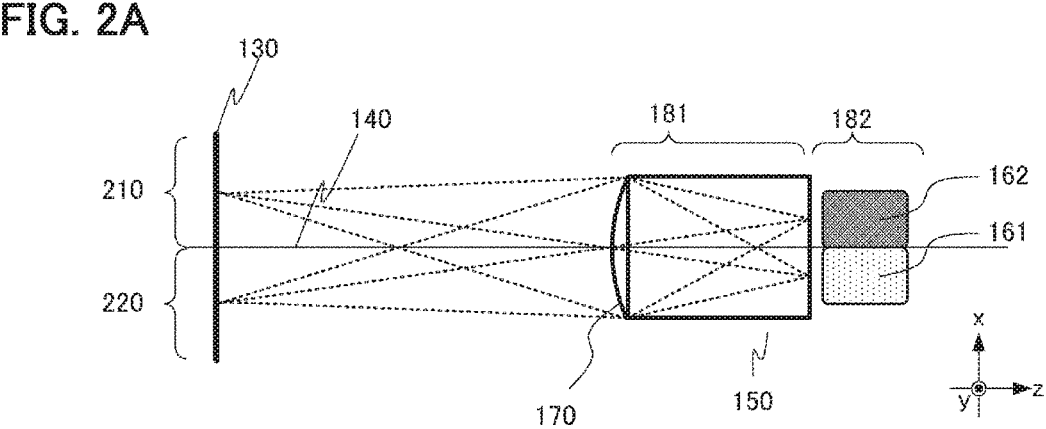
FIGS. 2A and 2B are views for illustrating a light flux received by photoelectric converters in the first embodiment.

FIG. 2A is a schematic view showing exclusively the exit pupil 130 of the image forming optical system 120 and a pixel 150 as a typical example of the pixels disposed in the image sensing device 101. The micro lens 170 in the pixel 150 shown in FIG. 2A is disposed so that the exit pupil 130 and the light receiving layer 182 are in an optically conjugate relation. As a result, as shown in FIG. 2A, a light flux passing through a first pupil region (210) as a partial pupil region encapsulated in the exit pupil 130 enters the first photoelectric converter 161. Similarly, a light flux passing through the second pupil region (220) as a partial pupil region enters the second photoelectric converter 162.

A plurality of first photoelectric converters 161 provided at the pixels photoelectrically convert the received light flux and generates first image data (image data A). Similarly, a plurality of second photoelectric converters 162 provided at the pixels photoelectrically convert the received light flux and generate second image data (image data B). An intensity distribution of an image (image A) formed on the image sensing device 101 by the light flux mainly passing through the first pupil region may be obtained from the first image data, and an intensity distribution of an image (image B) formed on the image sensing device 101 by the light flux mainly passing through the second pupil region may be obtained from the second image data.

Figure 2B:
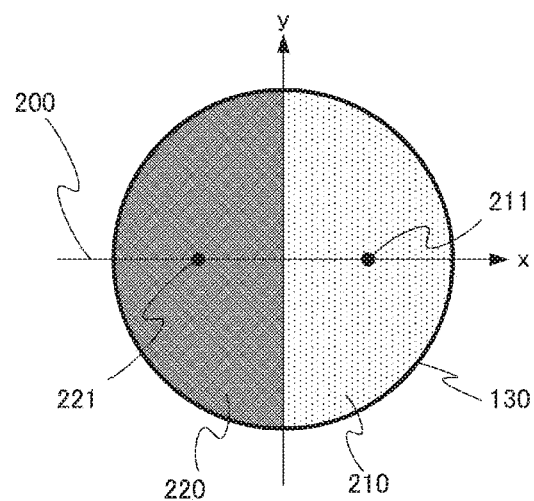

FIG. 2B shows the exit pupil 130 of the image forming optical system 120 in a view from a point of intersection (so-called center image height) of the optical axis 140 and the image sensing device 101. Reference numeral 211 denotes the position of the gravity center of the first pupil region 210 (first gravity center position), and reference numeral 221 denotes the position of the gravity center of the second pupil region 220 (second gravity center position). According to the embodiment, the first gravity center position 211 is eccentric with respect to (shifted from) the center of the exit pupil 130 along a first axis 200. On the other hand, the second gravity center position 221 is eccentric (shifted) in the opposite direction to the first gravity center position 211 along the first axis 200. In other words, the first pupil region and the second pupil region are eccentric along the first axis in different directions from each other. According to the embodiment, the first photoelectric converter 161 is shifted from the center of the pixel 150 in the x-y plane in the −x direction along the x-axis parallel to the first axis, and the first gravity center position 211 is eccentric in the +x direction along the first axis. On the other hand, the second photoelectric converter 162 is shifted from the center of the pixel 150 in the x-y plane in the +x direction along the x-axis parallel to the first axis, and therefore the second gravity center position 221 is eccentric in the −x direction along the first axis.

The first image data and the second image data are shifted in the direction (first axis) connecting the first gravity center position 211 and the second gravity center position 221 by defocus. The relative positional shift amount between the image data, i.e., the image shift amount between the image A and the image B is on the basis of the defocus amount. Therefore, the image shift amount between the first image data and the second image data may be obtained by the following method, and the depth to the object can be detected by converting the image shift amount into a defocus amount through a conversion coefficient.

Note that while in FIGS. 2A and 2B, x represents a positive region for the first pupil region and a negative region for the second pupil region, light actually reaching the light receiving layer 182 has a prescribed degree of broadening by diffraction of the light. Crosstalk of a carrier in the light receiving layer 182 also provides light with a prescribed degree of broadening. More specifically, also when a light flux passing through the region in which x is negative enters the second photoelectric converter 162, the first photoelectric converter 161 receives the light flux with low sensitivity. Therefore, the first pupil region and the second pupil region cannot be clearly separated, and there is an overlapping region. Herein, the first pupil region and the second pupil region are described as being clearly separated for the ease of description.

<Procedure for Calculating Depth and Confidence>

Figure 3:
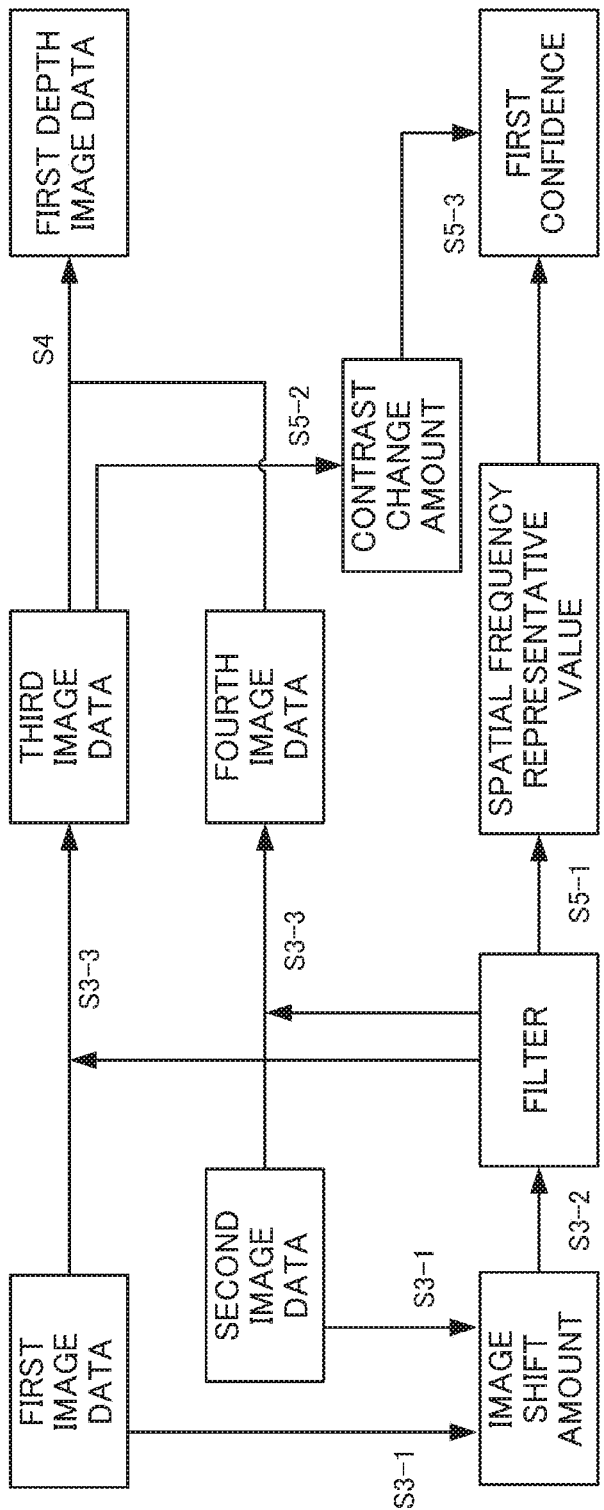
FIG. 3 is a data flow diagram for processing in the first embodiment.
Figure 4A:
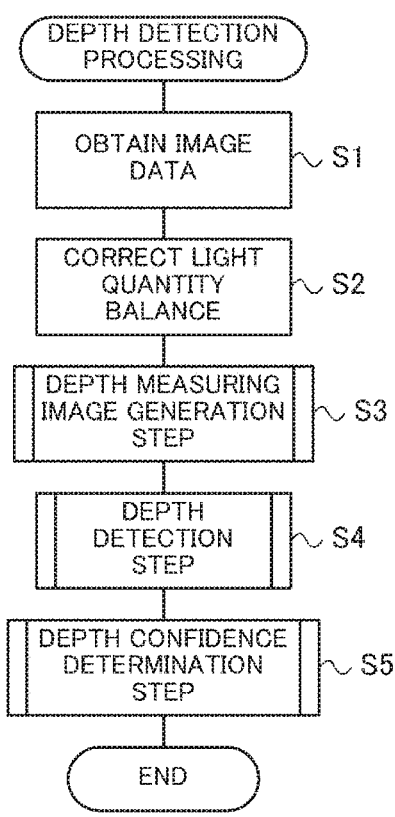
FIGS. 4A to 4D are flow charts for the processing in the first embodiment.

Now, the procedure for calculating a depth and confidence according to the embodiment will be described in detail with reference to FIGS. 3 and 4A. FIG. 3 is a diagram for illustrating the flow of data in the procedure for calculating a depth and confidence according to the embodiment. FIG. 4A is a flowchart for illustrating the procedure for calculating a depth and confidence. The procedure shown FIG. 4A is carried out by the arithmetic processor 102.

In step S1, the image reader 111 acquires the first image data and the second image data acquired by the image sensing device 101 and stored in the recording part 104.

In step S2, a preprocessor (not shown) carries out light quantity balance correction processing for correcting disproportion in the light quantity balance between the first image data and the second image data. The method for correcting the light quantity balance may be a known method, and for example a coefficient for correcting the light quantity balance between the first image data and the second image data can be calculated on the basis of an image captured by photographing a homogeneous surface light source in advance using the digital camera 100.

Figure 4B:
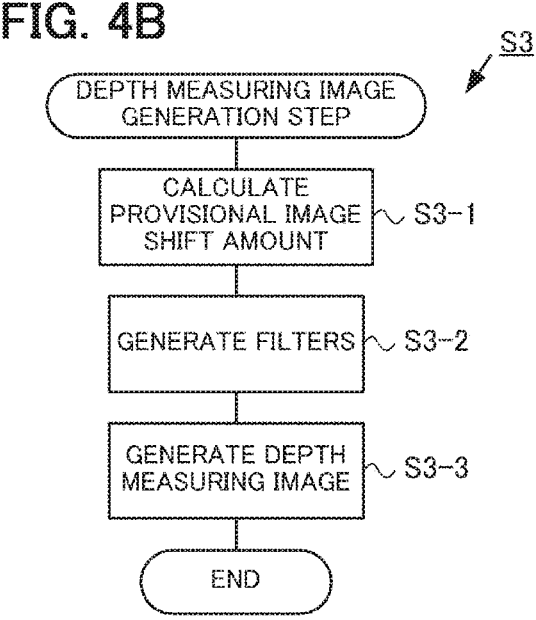

Step S3 is a depth measuring image generation step, and an image for depth calculation is produced. FIG. 4B is a chart for illustrating the depth measuring image generation step in step S3.

In step S3-1, the image shift amount acquirer 112 provisionally calculates an image shift amount using the first image data and the second image data. The image shift amount will hereinafter be referred to as a "provisional image shift amount." The method for calculating the image shift amount will be described with reference to FIG. 5A.

Figure 5A:
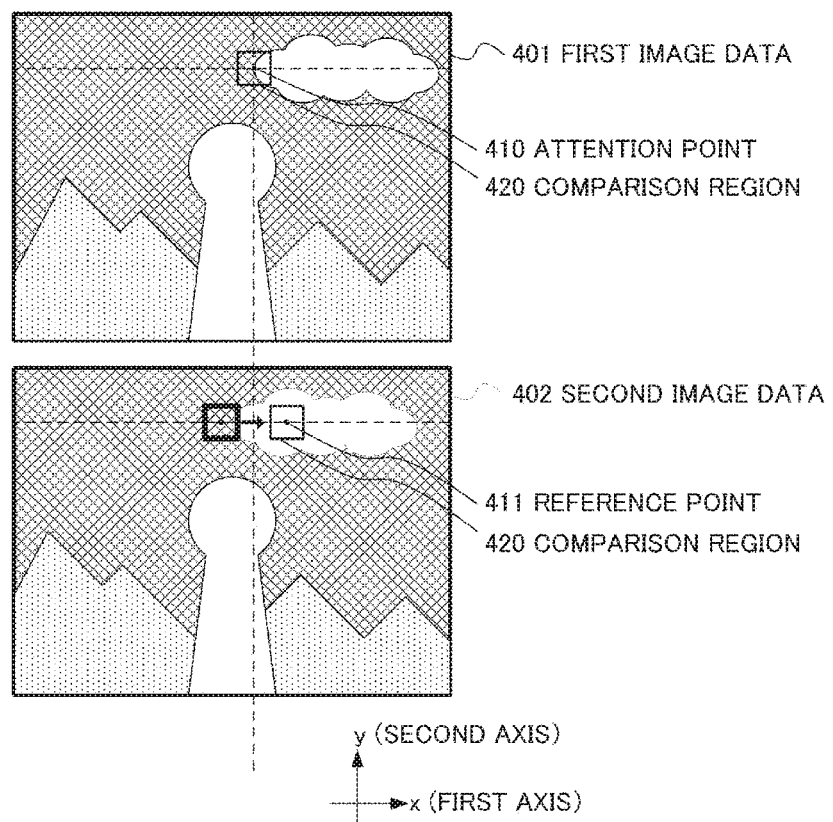
FIGS. 5A and 5B are views for illustrating calculation of an image shift amount in the first embodiment.

FIG. 5A shows the first image data 401 and the second image data 402, and the x-axis and the first axis are parallel to each other. The image shift amount acquirer 112 selects the first image data 401 as standard image data and sets a comparison region 420 around an attention point 410 on the first image data 401. If the comparison region 420 is small, a calculation error attributable to local arithmetic operation is generated for the image shift amount, and therefore a size about as large as 9 pixels by 9 pixels, for example, may desirably be used. Then, the image shift amount acquirer 112 selects the second image data 402 as reference image data and sets a reference point 411 on the second image data 402 and a comparison region 420 around the reference point 411. The image shift amount acquirer 112 calculates a degree of correlation between the first image data in the comparison region 420 and the second image data in the comparison region 420 along the first axis and sets the reference point 411 with the highest degree of correlation as a corresponding point. The relative positional shift amount between the attention point 410 and the corresponding point is obtained as an image shift amount. The corresponding point is searched for while the attention point 410 set on the first image data is sequentially moved along the first axis, so that the image shift amount in each of the pixel positions in the first image data can be calculated.

A known method for calculating a degree of correlation can be used. In the following description of the embodiment, sum of squared differences (SSD) is used, in other words, the sum of square differences between the first image data and the second image data is provided as a degree of correlation. The correlation value S according to SSD is calculated by Expression (1).

$$S = \Sigma (I_1(x_1, y_1) - I_2(x_2, y_2))^2 \quad (1)$$

where $I_1$ is the first image data, $I_2$ is the second image data, $x_1$ and $y_1$ are coordinates in the comparison region 420 on the first image data, and $x_2$ and $y_2$ are coordinates in the comparison region 420 on the second image data. The range of integration with the integral symbol represents a range within the comparison region 420.

In steps S3-2, a filter generator 113 generates a filter to be applied to the first image data and the second image data for generating a depth measuring image. In step S3-3, an image generator 114 generates a depth measuring image by applying the generated filter.

Figure 5B:
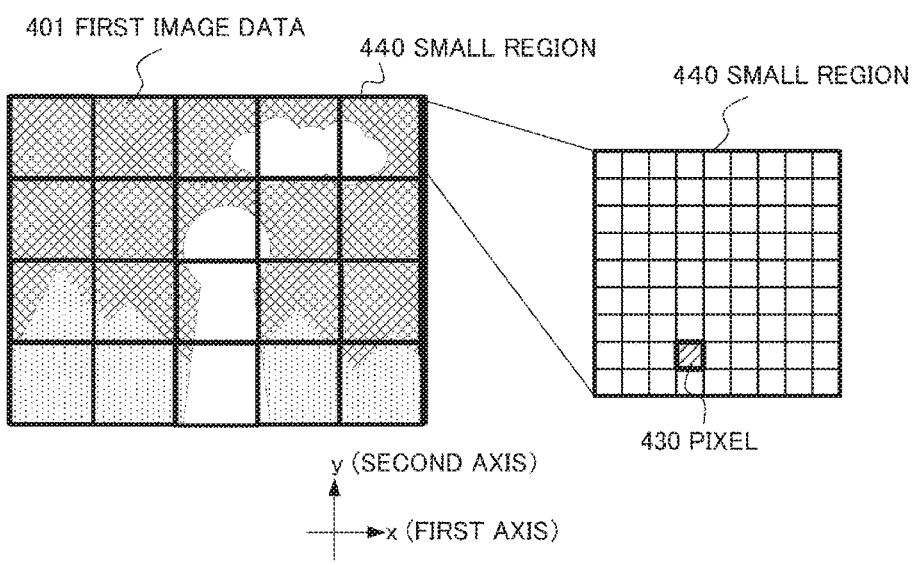

Steps S3-2 and S3-3 will be described more in detail with reference to FIG. 5B. The filter generator 113 divides the first image data into a plurality of small regions 440 as shown in FIG. 5B. The filter generator 113 obtains the average value of provisional image shift amounts corresponding to pixels 430 within the small regions 440 and generates a filter on the basis of the value. The image generator 114 applies to the filter generated for each of the small regions 440 to the small region 440. The same step is carried out for all the small regions of the first image data, and third image data can be generated from the first image data. The same step is carried out to the second image data, and fourth image data can be generated. The filter for the second image data may be the same filter as the filter for the first image data or a filter generated on the basis of the second image data.

The processing of producing a filter on the basis of the average value of the provisional image shift amounts within the small regions 440 will further be described. When the provisional image shift amount is large, the high frequency component of an object is reduced by defocus, and it is highly likely that the high frequency band of the image includes much noise. Therefore, when the provisional image shift amount is large, a filter that has a gain in the low frequency band and does not have a gain in the high frequency band is generated. On the other hand, when the provisional image shift amount is small, the defocus amount is small, and therefore it is highly likely that information exists from the low frequency band to the high frequency band of the image. Therefore, when the provisional image shift amount is small, a filter having a gain from the low frequency band to the high frequency band is generated. More specifically, as the provisional image shift amount is greater, a filter that cuts off a high frequency band is generated, and as the provisional image shift amount is smaller, a filter that passes a high frequency band is generated.

An example of the filter is a smoothing filter such as a moving average filter (averaging filter) or a Gaussian filter. As the kernel size (the range of pixels to be referred to in order to find an average value) increases, a greater part of the high frequency band is cut off, and as the kernel size decreases, a greater part of the high frequency band remains. This filtering allows image data including a larger part of the depth measuring signal and having reduced noise to be generated. Using the image generated in this way, the image shift amount can be calculated with high accuracy in step S4.

Figure 4C:
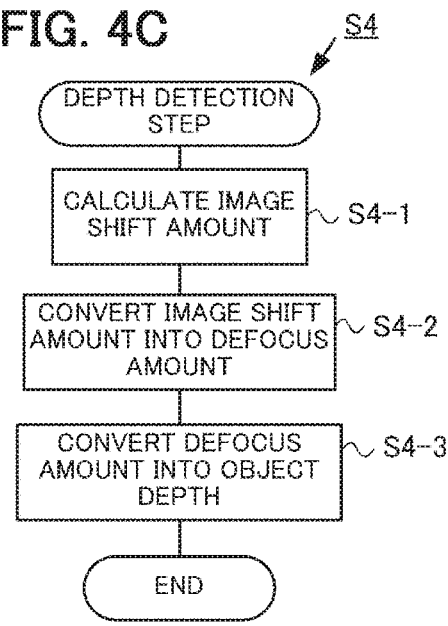

Step S4 is a depth detection step, and the depth to the object is detected on the basis of the third image data and the fourth image data. FIG. 4C illustrates the depth detection step in step S4. In step S4-1, the image shift amount acquirer 112 calculates the image shift amount between the third image data and the fourth image data by the same method as the method carried out in step S3-1. More specifically, a comparison region including an attention point is set on the third image data, and a comparison region including a reference point is set on the fourth image data. The image shift amount acquirer 112 searches a comparison region in the fourth image data having the highest correlation with the comparison region on the third image data and calculates the image shift amount. While the attention point set on the third image data is sequentially moved along the first axis, the search for a corresponding point is carried out, so that the image shift amount in each of pixel points in the third image data can be calculated.

In step S4-2, the depth calculator 115 converts the image shift amount calculated in step S4-1 into a defocus amount using a prescribed conversion coefficient. The defocus amount is the distance from the image sensing device 101 to the image forming optical system 120. When the image shift amount is d, the baseline length as the conversion coefficient is w, the distance from the image sensing device 101 to the exit pupil 130 is L, and the defocus amount is ΔL, the image shift amount d can be converted into the defocus amount ΔL by Expression (2).

$$\Delta L = \frac{d \cdot L}{w - d} \quad (2)$$

Note that the baseline w is the distance between the first gravity center position 211 and the second gravity center position 221 shown in FIG. 2B. According to the embodiment, while the image shift amount is converted into the defocus amount using Expression (2), as w»d is established in Expression (2), the defocus amount ΔL may be produced by an approximation for Expression (3).

$$\Delta L = Gaind \quad (3)$$

In step S4-3, the depth calculator 115 converts the defocus amount calculated in step S4-2 into the depth to the object. The defocus amount may be converted into the object depth using the image forming relation of the image forming optical system 120.

Figure 4D:
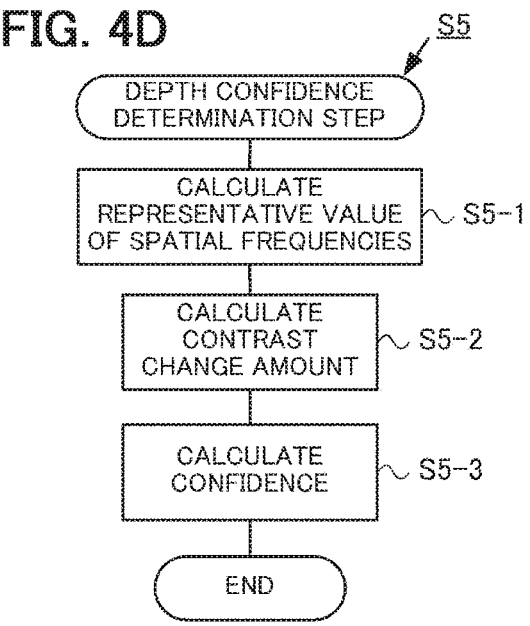

Step S5 is a confidence determination step, and confidence for the depth calculated in step S4 is calculated. The confidence determination step will be described with reference to FIGS. 4D, 6A, and 6B. Note that the confidence is obtained by expressing the confidence for the calculated depth in numbers, and the confidence has a higher value for a region with higher depth calculation accuracy.

Figure 6A:
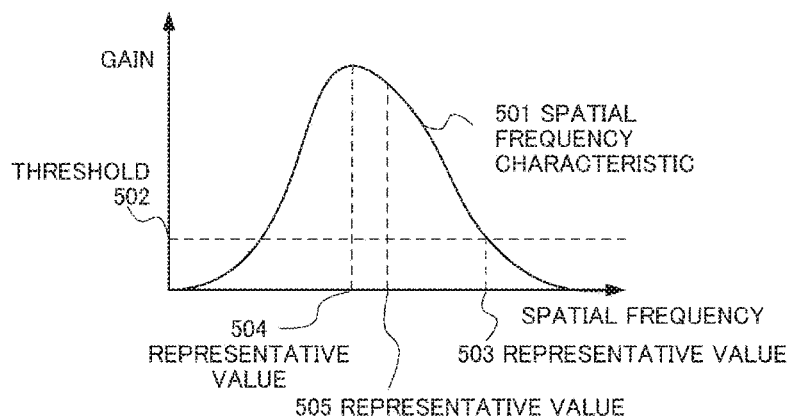
FIGS. 6A and 6B are a graph and a view for illustrating calculation of a representative value and a contrast change amount in the first embodiment.

In step S5-1, the representative value acquirer 116 calculates a representative value F as a representative spatial frequency in the spatial frequency distribution of the standard image data (which is the third image data in this case). For example, the representative value can be calculated on the basis of the first filter provided in step S3 with respect to the small region 440 for each of the small regions 440 in FIG. 5B. For example, the highest spatial frequency among spatial frequencies having a gain equal to or higher than a prescribed threshold in the special frequency characteristic of the first filter may be set as a representative value. FIG. 6A is a graph showing the spatial frequency characteristic 501 of the first filter, the abscissa represents the spatial frequency, and the ordinate represents the gain of the filter. A representative value acquirer 106 can obtain the range of spatial frequencies having a gain equal to or higher than a prescribed threshold 502 by referring to the spatial frequency characteristic 501 and set the highest frequency value 503 thereof as a representative value.

Here, the representative value of the spatial frequencies is obtained for each of the small regions, one representative value may be determined for a plurality of small regions. In this case, a representative value may be determined in the same manner as the above on the basis of a filter obtained by putting together a plurality of first filters generated for the plurality of small regions or a representative value may be determined for each of the filters in the same manner as the above and the values may be put together to obtain one representative value. Alternatively, it may be considered that a representative value of the spatial frequencies may substantially be determined on the basis of the provisional image shift amounts in the small region if the first filter is determined on the basis of the average value of provisional image shift amounts in the small region.

Figure 6B:
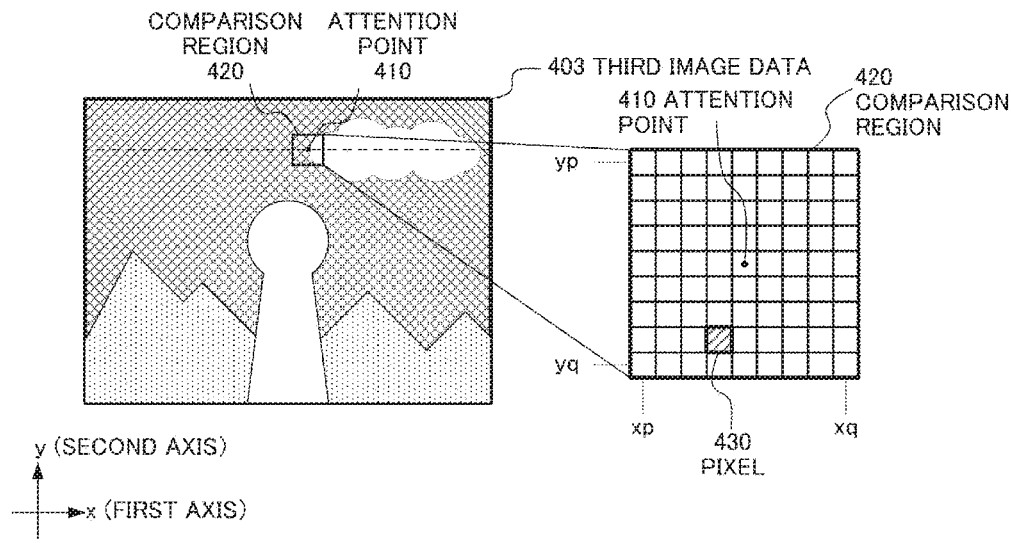

In step S5-2, a contrast change acquirer 117 calculates a contrast change amount (evaluation value) that represents the magnitude of contrast change. The method for calculating the contrast change amount will be described with reference to FIG. 6B. FIG. 6B shows the third image data 403, the attention point 410 used for calculating the image shift amount in step S4-1, and the comparison region 420. In FIG. 6B, the comparison region 420 is enlarged, and a hatched region 430 indicates one pixel. In the following description, the comparison region 420 corresponds to the range between pixel coordinates xp and xq in the x direction and between pixel coordinates yp to yq in the y direction, and the coordinates of the attention point 410 are (x, y).

According to the embodiment, the variance of the pixel value in the first image data included in the comparison region 420 is used as the contrast change amount. The contrast change amount C(x, y) is calculated by Expressions (4a) and (4b).

$$C(x, y) = \frac{1}{Nx} \sum_{xi=xp}^{xq} (I(xi, y) - Iave)^2 \quad (4a)$$

$$Iave = \frac{1}{Nx} \sum_{xi=xp}^{xq} I(xi, y) \quad (4b)$$

where I(x, y) represents the pixel value in the third image data in the pixel position (x, y), and N represents the number of pixels included in the comparison region 420.

In step S5-3, the confidence determiner 118 calculates confidence R(x, y) in the pixel position (x, y) from the representative value F(x, y) of the spatial frequencies and the contrast change amount C(x, y) calculated in steps S5-1 and S5-2. According to the embodiment, the confidence R is calculated from Expression (5).

$$R(x,y)=C(x,y) \cdot F^2(x,y) \quad (5)$$

Expression (5) indicates that as the representative value F of the spatial frequencies increases (to higher frequencies) and the contrast change amount increases, the confidence R attains a higher value, in other words, the confidence increases. Note that the confidence may be a value obtained from Expression (5) such as a value obtained as a constant multiple of Expression (5) or by adding a prescribed value to Expression (5).

Using the confidence, the confidence for the detected depth can be determined with high accuracy. The confidence can be obtained with a reduced calculation load without having to calculate a spatial frequency distribution by the Fourier transform of the images, so that high speed confidence determination can be carried out. Note that the method for determining the confidence R according to the present invention is not limited to the method by Expression (5). In Expression (5), an arbitrary constant may be used in place of the contrast change amount C. Alternatively, the confidence R may be determined proportionately to the representative value F of the spatial frequencies raised to the power of 1(R(x, y)=C(x, y)·F(x, y)). More specifically, if the confidence R is determined to have a value representing higher confidence as the value of the representative value F increases, the calculation formula therefor is not particularly limited. An advantageous effect can be obtained to a prescribed extent using any of these kinds of confidence.

Advantageous Effects

Figure 7A:
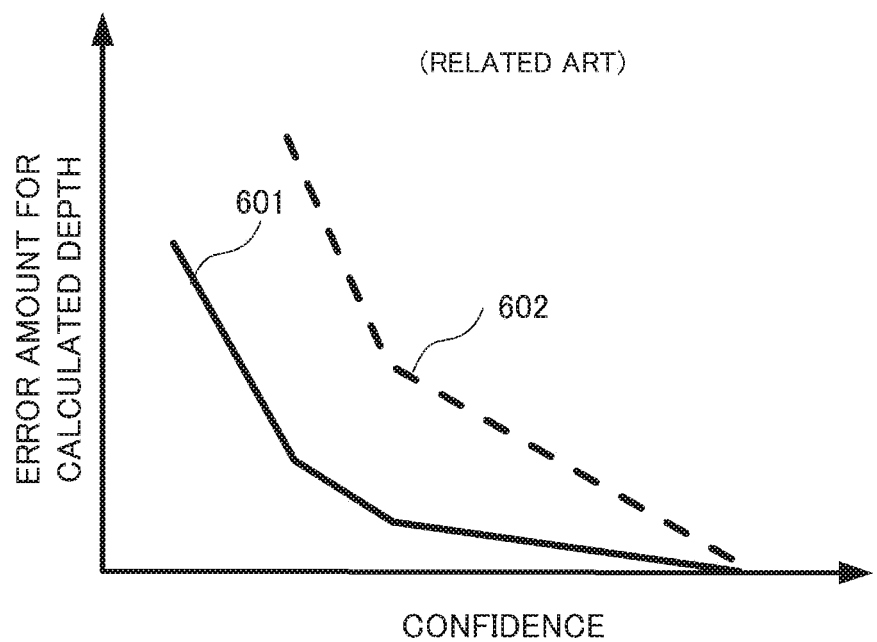
FIGS. 7A and 7B are graphs showing the relation between confidence and an error for a depth in a conventional case and the first embodiment.
Figure 7B:
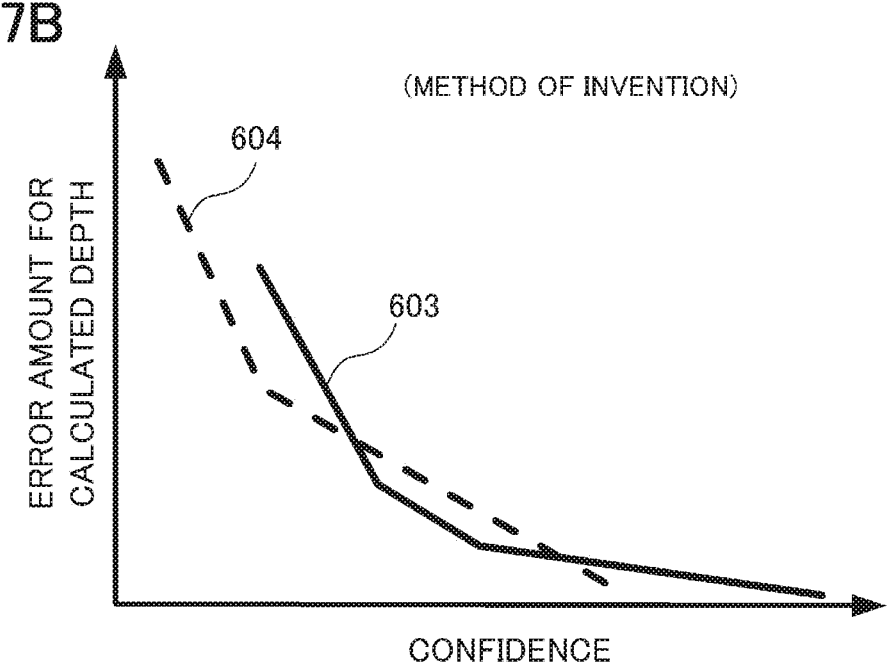

An object at a known distance is photographed and the relation between a depth accuracy and confidence calculated for each of small regions of the image is given in FIGS. 7A and 7B. FIG. 7A shows a result obtained when the confidence is calculated using only a contrast change amount in a conventional example. FIG. 7B shows a result obtained when the confidence is calculated using a representative value of spatial frequencies and a contrast change amount according to the embodiment. In these figures, the abscissa represents the confidence and greater values represent higher confidence for the calculated depth. The ordinate represents an error amount for the calculated depth. Solid lines 601 and 603 indicate results in a small region subjected to a filter having a gain from the low frequency band to the high frequency band. Broken lines 602 and 604 in the figures represent a result in a small region subjected to a filter having a gain only in the low frequency band. As can be understood from FIG. 7A, using the conventional confidence, the error amounts of the solid line 601 and the broken line 602 for the same confidence value are significantly different, and the confidence for the calculated depth cannot be determined. On the other hand, using the confidence according to the embodiment as shown in FIG. 7B, the error amounts of the solid line 603 and the broken line 604 are close values for the same confidence value. In other words, if the spatial frequency distribution included in the image changes, the confidence for the calculated depth can be determined with high accuracy.

<Reasons for Improvement>

The following details the reason why confidence for a calculated depth included in an image can be determined with high accuracy using the confidence according to the embodiment even if the spatial frequency distribution included in the image changes.

Figure 8A:
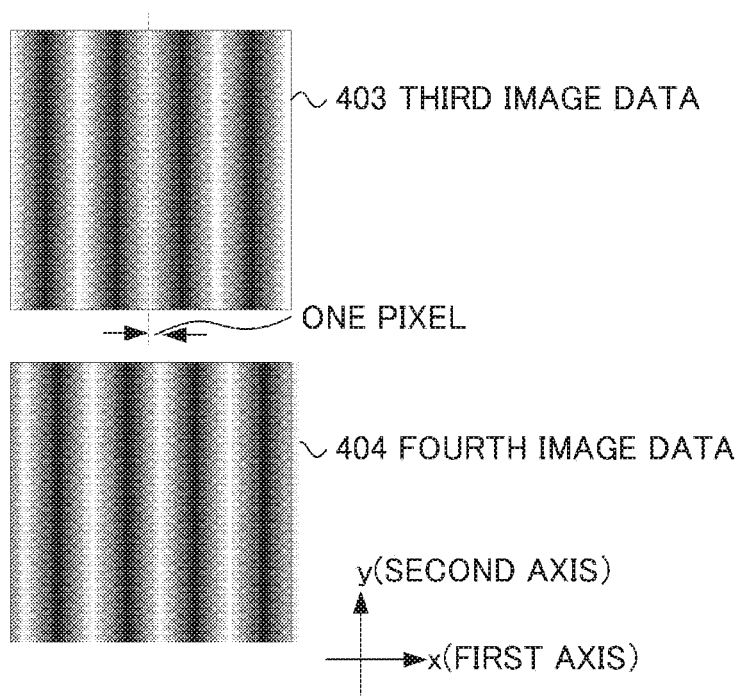
FIGS. 8A and 8B are a view and a graph for explaining the reason why confidence is highly accurate in the first embodiment.
Figure 8B:
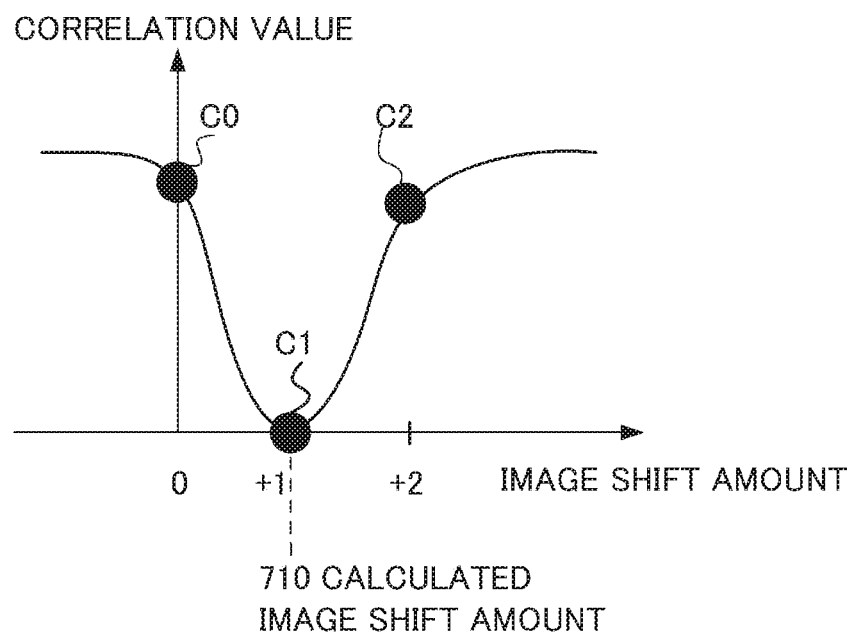

As shown in FIG. 8A, it is assumed that the third image data 403 and the fourth image data 404 are images having their pixel values changed with a cosine function of a spatial frequency f in the x direction and have an image shift amount corresponding to one pixel from each other. The first image is a standard image, the second image is a reference image, and correlation values for shifts from zero pixel to two pixels are C0, C1, and C2, respectively. FIG. 8B shows the correlation value when the first image and the second image have no noise, the abscissa represents the given amount of image shift amount, the ordinate represents the correlation value, and the dots represent correlation values with given shift amounts. As shown in FIG. 8B, the correlation value takes an extreme value when the shift is +1 pixel, and the calculated image shift amount 710 is +1 pixel equal to the correct value.

Now, it is assumed that the first image and the second image have noise. The presence of the noise changes the correlation values and the extreme value for the correlation value is slightly shifted from the position of +1 pixel. Therefore, there is an error for the calculated image shift amount. At the time, if the correlation values C0 and C2 are greater than the correlation value C1, the extreme value for the correlation value stays in the vicinity of the correct image shift amount if the correlation value changes by the noise, so that the calculation error for the image shift amount is reduced.

When a first image $I_1$ and a second image $I_2$ can be expressed by Expressions (6a) and (6b) using noise amounts $N_1$ and $N_2$, the correlation values C0, C1, and C2 are expressed by Expressions (7a) to (7c), respectively.

$$I_1(x) = A \cdot \cos(f \cdot x) + N_1 \qquad (6a)$$

$$I_2(x) = A \cdot \cos(f \cdot (x-1)) \qquad (6b)$$

$$C0 = \sum [(A \cdot \cos(f \cdot x) + N_1) - (A \cdot \cos(f \cdot (x-1)) + N_2)]^2 \qquad (7a)$$
$$\approx A^2 \cdot f^2 \cdot W + NC0$$

$$C1 = \sum [(A \cdot \cos(f \cdot x) + N_1) - (A \cdot \cos(f \cdot (x+1-1)) + N_2)]^2 \qquad (7b)$$
$$= 0 + NC1$$

$$C2 = \sum [(A \cdot \cos(f \cdot x) + N_1) - (A \cdot \cos(f \cdot (x+2-1)) + N_2)]^2 \qquad (7c)$$
$$= A^2 \cdot f^2 \cdot W + NC2$$

where A represents an image amplitude, W represents the number of pixels included in a reference region, N1 and N2 represent noises included in the images, and NC0, NC1, and NC2 represent change amounts for the correlation values caused by the noises.

As in Expressions (7a) and (7c), the correlation values C0 and C2 are each proportional to a square of the spatial frequency f included in the image. This indicates that the correlation value is proportional to the square of the spatial frequency f included in the image and increases in the vicinity of the maximum value, and the influence of the error caused by the noise is reduced. As described above, when the image shift amount is calculated using SSD, the confidence may be generated to be higher in proportion to the square of the spatial frequency f, so that the confidence for the calculated depth can be evaluated with high accuracy.

As can be understood from Expressions (7a) and (7c), the correlation values C0 and C2 are proportional to the square of the amplitude A. The square value of the amplitude A is proportional to the contrast change amount of the image represented by Expression (4a). Therefore, the confidence maybe generated so that the confidence increases in proportion to the contrast change amount in addition to the spatial frequency as described above, so that the confidence for the calculated depth can be evaluated with high accuracy.

For these reasons, the confidence for the calculated depth can be evaluated with high accuracy using the confidence according to the embodiment even if the spatial frequency distribution included in the image changes.

<Filters and Representative Value of Spatial Frequencies>

In step S3, the first image data and the second image data may be subjected to different filters. In FIGS. 2A and 2B, the first pupil region 210 and the second pupil region 220 are symmetric with respect to the center of the exit pupil 130 but in an actual image forming optical system, the regions are sometimes asymmetric to each other by vignetting caused by a diaphragm or a lens frame. Such asymmetry is often observed around the image sensing device, and the first image data and the second image data are likely to have different spatial frequency distributions by the influence. Therefore, the first image data and the second image data may be subjected to filters in which different bands have a gain, so that image data with reduced difference between the spatial frequency distributions included in these kinds of image data can be generated. Using these images, the image shift amount may be calculated with high accuracy even if the images are obtained around the image sensing device.

Alternatively, as disclosed in Japanese Patent No. 3240648, a filter for correcting the image shape difference between first image data and second image data maybe used. Using the images processed with these filters, the image shape difference can be corrected, so that the image shift amount can be calculated with high accuracy.

The filter for the first image may be generated using a provisional image shift amount produced using the first image data as a standard image and the second image data as a reference image. Then, the filter for the second image maybe generated using a provisional image shift amount produced using the second image data as a standard image and the first image data as a reference image. An image shift amount in each pixel position on the respective image data may be calculated with higher accuracy, so that the filters to be applied to the pixels may be generated with higher accuracy.

In the method according to the embodiment, the filters are generated from the average value of the provisional image shift amounts of the pixels included in each of the small regions, but the method for generating the filters is not limited to the above. For example, the filter may be generated using a maximum value or a representative value of the provisional image shift amounts of the pixels and still the same advantageous effect as the above may be provided.

In step S5, a representative value of the spatial frequency distribution may be obtained by other methods. In FIG. 6A, a spatial frequency 504 for which the first filter has a maximum gain may be set as a representative value. Alternatively, a spatial frequency 505 obtained by weighted-averaging the spatial frequencies by the gain may be the representative value. The spatial frequency 505 can be calculated by Expression (8).

$$F = \frac{\sum f \cdot G(f)}{\sum G(f)} \quad (8)$$

where F represents the representative value, f represents the spatial frequency, G represents the gain, and the range of integration represents the range of the spatial frequency band.

When the first image and the second image are subjected to different filters, a representative value may be acquired on the basis of the spatial frequency characteristics of both of the filters for the first image and the second image. The above advantageous effect can be provided when the confidence is generated using a representative value obtained by any of these methods.

Note that an image shift amount can be calculated highly accurately by pattern matching for a subject having contrast change in a direction parallel to the first axis. However, as for a subject with small contrast change in the direction, a large detection error for the image shift amount results. Therefore, a representative value of the spatial frequency distribution is desirably obtained from spatial frequencies in a direction parallel to the first axis (the direction that connects the gravity centers 211 and 221 of the two pupil regions 210 and 220). In this way, the confidence can be calculated with even higher accuracy.

In the method according to the embodiment, in steps S3 and S5, the filters and the representative value of the spatial frequencies are calculated in appropriate timing, but the filters and the representative value of the spatial frequencies can be obtained by other methods. For example, filters and representative values of spatial frequencies corresponding to the magnitudes of provisional shift amounts are stored in advance, and a filter and a representative value of spatial frequencies that are appropriate for a provisional shift amount may be used. In this case, the recording part 104 is configured to previously store information about filters corresponding to the magnitudes of provisional shift amounts and representative values of spatial frequencies of the filters. Then, the image generator 114 reads out, from the recording part 104, data about a filter and a representative value of spatial frequencies corresponding to a provisional image shift amount calculated in step S3-2 and uses the read out data. In this way, data about a filter and a representative value that are appropriate for the provisional image shift amount can be obtained at high speed, so that a depth and confidence can be calculated at high speed.

<Order of Depth Calculation Step and Confidence Calculation Step>

In the depth calculation apparatus according to the embodiment, the depth calculation step in step S4 is followed by the confidence calculation step in step S5 as shown in FIG. 4A. However, the depth calculation step in step S4 may be carried out after the confidence calculation step in step S5. When step S5 is carried out before step S4, confidence can be obtained before a depth is calculated. Therefore, parameters (such as the size of the comparison region 420 and the search range for a corresponding point) to be used in detecting a depth in the depth detection step in step S4 may be set on the basis of the obtained confidence, so that the depth to the object can effectively be calculated with higher accuracy.

<Method for Calculating Other Correlation Values and Confidence>

In the above description of the embodiments, the confidence is obtained using SSD as the degree of correlation, while the calculation formula for the confidence may be changed corresponding to a formula for calculating a degree of correlation.

For example, a method using the sub of absolute differences sum of absolute differences (SAD) between two image data pieces as a degree of correlation will be described. A correlation value by SAD is obtained by Expression (9).

$$S = \sum |I_1(x_1, y_1) - I_2(x_1, y_2)| \quad (9)$$

where $I_1$ is the first image data, $I_2$ is the second image data, $x_1$ and $y_1$ are coordinates in the comparison region 420 on the first image data, and $x_2$ and $y_2$ are coordinates in the comparison region 420 on the second image data. The range of integration with the integral symbol represents a range in the comparison region 420.

The confidence in this case is calculated by Expression (10).

$$R(x, y) = C \cdot F(x, y) \quad (10)$$

where F represents a representative value of spatial frequencies, and C represents a contrast change amount or an arbitrary constant.

Alternatively, a normalized cross-correlation function may be used as a degree of correlation. This approach is also called normalized cross-correlation (NCC) or zero-mean normalized cross-correlation (ZNCC). A correlation value according to NCC is obtained by Expression (11), and a correlation value according to ZNCC is obtained by Expression (12).

$$S = \frac{\sum (I_1(x_1, y_1) \cdot I_2(x_2, y_2))}{\sqrt{\sum I_1^2(x_1, y_1) \times \sum I_2^2(x_2, y_2)}} \quad (11)$$

$$S = \frac{\sum ((I_1(x_1, y_1) - Iave_1) \cdot (I_2(x_2, y_2) - Iave_2))}{\sqrt{\sum (I_1(x_1, y_1) - Iave_1)^2 \times \sum (I_2(x_2, y_2) - Iave_2)^2}} \quad (12)$$

where $I_1$ is the first image data, $I_2$ is the second image data, $x_1$ and $y_1$ are coordinates in the comparison region 420 on the first image data, and $x_2$ and $y_2$ are coordinates in the comparison region 420 on the second image data. The range of integration with the integral symbol represents a range in the comparison region 420. Iave1 and Iave2 are the average values of the image data in the comparison regions.

The confidence in this case may be calculated by Expression (13).

$$R(x, y) = C \cdot F^2(x, y) \quad (13)$$

where F represents a representative value of spatial frequencies, and C represents a contrast change amount or an arbitrary constant.

The description given in conjunction with FIGS. 8A and 8B also applies to these kinds of confidence. Using these kinds of confidence, even if the spatial frequency component included in the image changes, confidence for a calculated depth can be evaluated with high accuracy for the same reason as the above.

<Contrast Change Amount>

In the confidence determination step described above, the variance of a pixel value is calculated for evaluating a contrast change amount, but the use of the variance is not necessarily essential if the magnitude of contrast change can be evaluated. For example, the magnitude of contrast change may be evaluated using a standard deviation, the differential absolute value between maximum and minimum values for the pixel value, the maximum value of the absolute value of a result obtained by differentiating a pixel value in the first axis direction and the average of the absolute values. Desirably, a variance or standard deviation, which is a statistical evaluation, may be used to reduce the influence of noise. It is desirable to choose a variance or standard deviation which matches the calculation formula for the degree of correlation in calculating the image shift amount. In other words, when the sum of absolute differences (SAD) between the first image data and the second image data is used as the calculation formula for the degree of correlation, the standard deviation of the pixel value is desirably used, while when the sum of squared differences (SSD) is used, the variance of the pixel value is desirably used.

In the template matching, the contrast change amount in the first axis direction in the comparison region strongly affects the matching accuracy. The contrast change amount is calculated in the first axis direction for each row in the comparison region, and a contrast change amount corresponding to the comparison region may be calculated by adding up or averaging the contrast change amounts in the comparison region. Using the contrast change amount, confidence with higher accuracy can be obtained.

In the confidence determination step according to the embodiment, the contrast change amount is calculated using the first image data but the contrast change amount may be calculated using both the first image data and the second image data. Alternatively, the contrast change amount may be calculated using the third image data generated by combining the first image data and the second image data. The first image data and the second image data may be combined using the sum or average of pixel values in corresponding pixel positions.

The ratio between the variance of a pixel value and a noise amount estimation value in image data (that will be described next) may be used as the contrast change amount. In the method for calculating a noise amount estimation value, an object having a homogeneous luminance distribution is photographed in advance by the digital camera 100, and a noise amount generated at the image sensing device 101 is calculated. The calculated noise amount is approximated according to an approximation, so that the pixel value and the noise amount can be associated with each other. The noise amount is approximated by Expression (14), while characteristics about reading out noise, optical shot noise, and dark current shot noise generated at the image sensing device 101 are taken into consideration.

$$N(x, y) = ISO \cdot \sqrt{A^2 + (B \cdot I(x,y))^2} \quad (14)$$

where $N(x, y)$ is the noise estimation value in a pixel position $(x, y)$, ISO is the ISO sensitivity of the digital camera 100 during photographing, $I(x, y)$ is the pixel value of the first image data in the pixel position $(x, y)$, and A and B are approximation parameters used in approximation.

Using the approximation in consideration of the noise characteristics generated at the image sensing device 101, the noise amount can accurately be approximated. Note that in Expression (14), the approximation parameter A is a constant, while the approximation parameter A is desirably a variable of exposure time during photographing by the digital camera 100 in order to take the influence of dark current shot noise into consideration with higher accuracy. In order to calculate a noise amount estimation value in a simpler manner while the noise characteristics generated at the image sensing device 101 are taken into consideration, the noise amount may be approximated by Expression (15).

$$N(x, y) = ISO \cdot \max(A, B \cdot I(x, y)) \quad (15)$$

where max(a, b) indicates that a maximum value is calculated by comparing a and b.

The ratio of the noise amount estimation value thus obtained and the variance of the pixel value may be used as the contrast change amount. Using the digital camera 100, high-speed photography is carried out or an object with high illuminance is taken, a large amount of noise is included in the image. By calculating a contrast change amount and confidence in consideration of the noise amount, the confidence for the depth can be calculated with high accuracy even when there is much noise.

Note that the pixel value in the pixel position $(x, y)$ is used in order to estimate a noise amount in the pixel position $(x, y)$, but the noise amount maybe estimated using the average value of the pixel values included in the comparison regions. Using the average pixel value in the comparison regions, the noise amount can be estimated under a condition closer to the condition for the image shift amount calculation, so that the confidence can be calculated with higher accuracy. When the variance of the pixel value is used, an approximation for Expression (15) is used while when a standard deviation of the pixel value is used, an approximation asymptotically approaching a square root function is desirably used rather than an approximation asymptotically approaching a linear function as in Expression (15).

<Modification of Depth Detection Processing>

In the foregoing, a depth is detected from image data (the third image data and the fourth image data) obtained after filters are applied to the image data (the first image data and the second image data) that is obtained by the image sensing device. However, a depth may be detected from the first image data and the second image data without applying the filters. In this case, the representative value acquirer 116 may determine a representative value on the basis of the image shift amount between the first image data and the second image data. More specifically, the representative value may be determined to be smaller as the image shift amount increases. As described above, this is because as the defocus increases, the image shift amount increases, the high frequency component of the image decrease, and the low frequency component increases. According to the embodiment, since a filter is obtained from the image shift amount between the first image data and the second image data, and a representative value is determined from the filter, the same representative value can directly be determined on the basis of the image shift amount between the first image data and the second image data.

Second Embodiment

Now, a second embodiment of the present invention different from the first embodiment of the present invention in the depth detection procedure will be described.

In the following, a digital camera will be described as an example of a device including a depth detection apparatus according to the present invention, but the application of the present invention is not limited to a digital camera. For example, the depth detection apparatus according to the present invention may be applied to a digital range finder.

Similarly to the first embodiment, the digital camera 100 according to the embodiment is configured by disposing, in a camera case 190, an image forming optical system 120, an image sensing device 101, a depth detection apparatus 110, an image generator (not shown), and a lens driving controller (not shown). The depth detection apparatus 110 includes the image forming optical system 120, the image sensing device 101, an arithmetic processor 102, and a recording part 104.

Figure 9A:
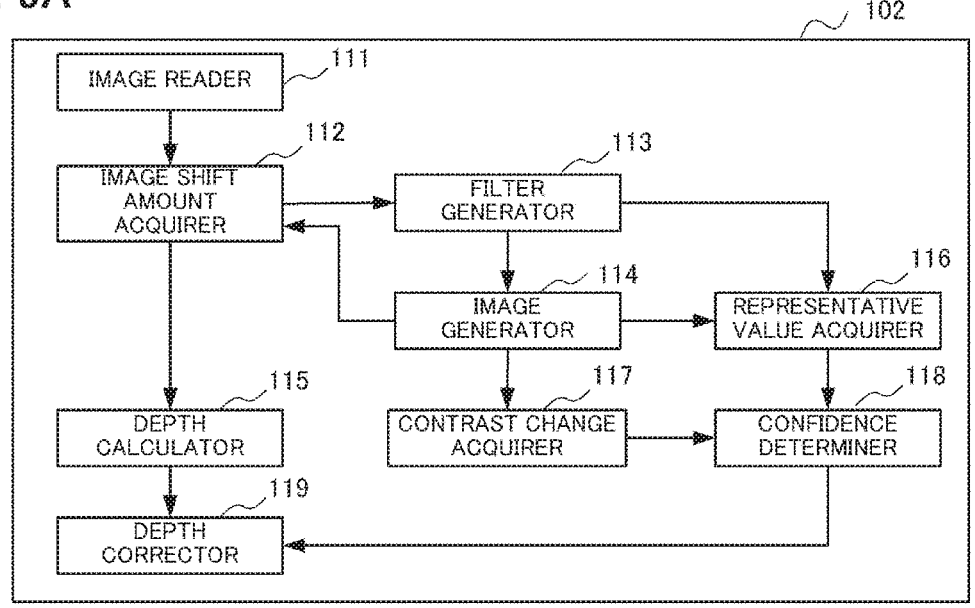
FIGS. 9A to 9C are a diagram and flowcharts for illustrating a configuration and processing in a second embodiment.

FIG. 9A shows a functional part in the arithmetic processor 102 in the embodiment. The embodiment is different from the first embodiment in that a depth corrector 119 is provided.

<Description of Procedure for Calculating Depth and Confidence>

Figure 9B:
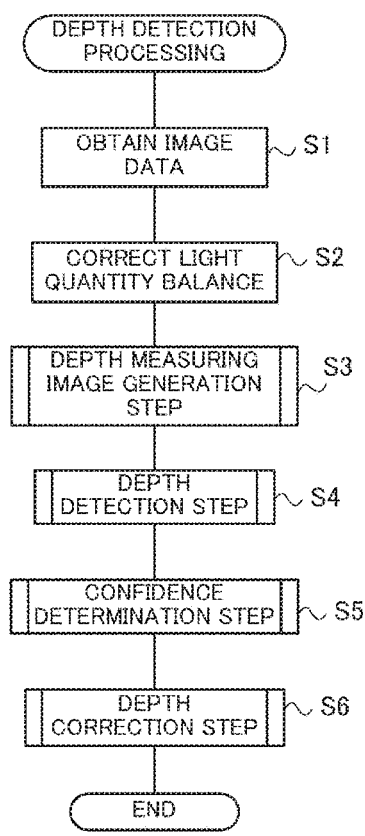
Figure 9C:
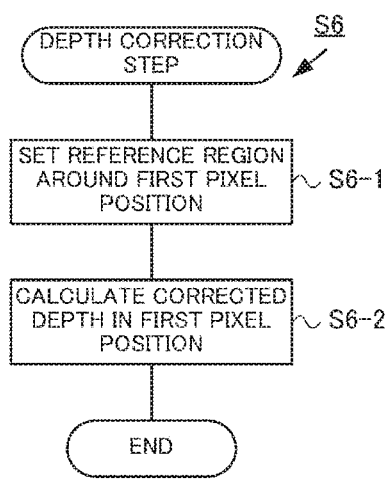

The procedure for calculating a depth and confidence according to the embodiment will be described with reference to FIGS. 9B and 9C. FIG. 9B illustrates the procedure for calculating a depth and confidence. In FIG. 9B, the parts of the procedure that are the same as those of the first embodiment are denoted by the same reference characters.

In step S1, the image reader 111 obtains first image data and second image data obtained by the image sensing device 101 and stored in the recording part 104.

In step S2, a preprocessor (not shown) carries out light quantity balance correction processing for correcting disproportion in the light quantity balance between the first image data and the second image data. The light quantity balance correction may be carried out by a known method.

Step S3 is a depth measuring image generation step, and an image for depth detection is generated from the first image data and the second image data. More specifically, the image shift amount acquirer 112 provisionally calculates an image shift amount using the first image data and the second image data. Then, the filter generator 113 generates filters on the basis of the value of the provisional image amount. Then, the image generator 114 generates third image data and fourth image data by subjecting the first image data and the second image data to the filters.

Step S4 is a depth detection step, and the image shift amount acquirer 112 calculates the image shift amount between the third image data and the fourth image data, and the depth calculator 115 converts the image shift amount into a depth to the object. While moving the attention point 410 set in the third image data, the depth to the object is calculated in a plurality of pixel positions and depth image data is generated.

Step S5 is a confidence determination step, and the confidence determiner 118 calculates confidence for the depths in a plurality of pixel positions while moving the attention point 410 similarly to step S3 and generates confidence image data.

Step S6 is a depth correction step, and the depth corrector 119 calculates a corrected depth on the basis of the depth image data and the confidence image data. The procedure in step S6 will be described with reference to FIG. 9C. In step S6-1, the depth corrector 119 sets a first pixel position in the depth image data and a reference range around the first pixel position. In step S6-2, the depth corrector 119 calculates a corrected depth for a third pixel position. More specifically, a result obtained by weighted-averaging the depth image data included in the reference range set in step S6-1 by the confidence image data is calculated as the corrected depth. The depth corrector 119 generates corrected depth image data by calculating corrected depth information while moving the third pixel position.

More specifically, the corrected depth image data is generated by weighted-averaging the depth image data using the confidence image data as in Expression (16).

$$Dc(x, y) = \frac{\sum_{y=yp}^{yq} \sum_{x=xp}^{xq} Conf(x, y) \cdot Dr(x, y)}{\sum_{y=yp}^{yq} \sum_{x=xp}^{xq} Conf(x, y)} \quad (16)$$

where Dr(x, y) represents depth image data in the pixel position (x, y), Dc(x, y) represents corrected depth image data in the pixel position (x, y), and Conf(x, y) represents confidence image data in the pixel position (x, y).

In the depth detection procedure according to the embodiment, in step S6, the corrected depth image data is calculated by weighted-averaging on the basis of the depth image data and the confidence image data.

Weighted-averaging on the basis of the confidence image data enables smoothing while the ratio of a region with a smaller calculation error for the depth image data is increased. As a result, the calculated corrected depth is a highly accurate object depth.

According to the embodiment, the weight average is obtained using the confidence image data as in Expression (16) but the weight averaging is not necessarily essential. For example, the confidence image data may be divided into a region with confidence and a region without confidence on the basis of a preset threshold, and the corrected depth image data may be calculated by calculating an average value using only the depth image data in the pixel positions corresponding to the region with confidence. By using the first image data, corrected depth can be calculated with high accuracy even when a plurality of objects exist within an angle of field. More specifically, as in Expression (17), the depth image data may be subjected to weighted averaging on the basis of the confidence image data and image information data.

$$Dc(x, y) = \frac{\sum_{y=yp}^{yq} \sum_{x=xp}^{xq} Ic(x, y) \cdot Conf(x, y) \cdot Dr(x, y)}{\sum_{y=yp}^{yq} \sum_{x=xp}^{xq} Ic(x, y) \cdot Conf(x, y)} \qquad (17)$$

Color difference, illuminance difference, and contrast change amount difference with reference to the pixel position (x, y) can be used as the image information data. Note that in Expression (17), Ic is the image information data in the pixel position (x, y). Weighted averaging may be carried out so that pixel positions further from the third pixel position have a lower ratio.

Third Embodiment

Now, a third embodiment of the present invention different from the first embodiment of the present invention in the depth detection procedure will be described with reference to the drawings.

In the following, a digital camera is used as an example of a device including a depth detection apparatus according to the present invention, but the application of the present invention is not limited to a digital camera. For example, the depth detection apparatus according to the present invention may be applied to a digital range finder.

Similarly to the first embodiment, the digital camera 100 according to the embodiment is configured by disposing, in a camera case 190, an image forming optical system 120, an image sensing device 101, an arithmetic processor 102, a recording part 104. The depth detection apparatus 110 includes the image forming optical system 120, the image sensing device 101, the arithmetic processor 102, and the recording part 104. A functional part provided in the arithmetic processor 102 is substantially the same as that of the second embodiment (FIG. 9A).

<Description of Procedure for Calculating Depth and Confidence>

Figure 10:
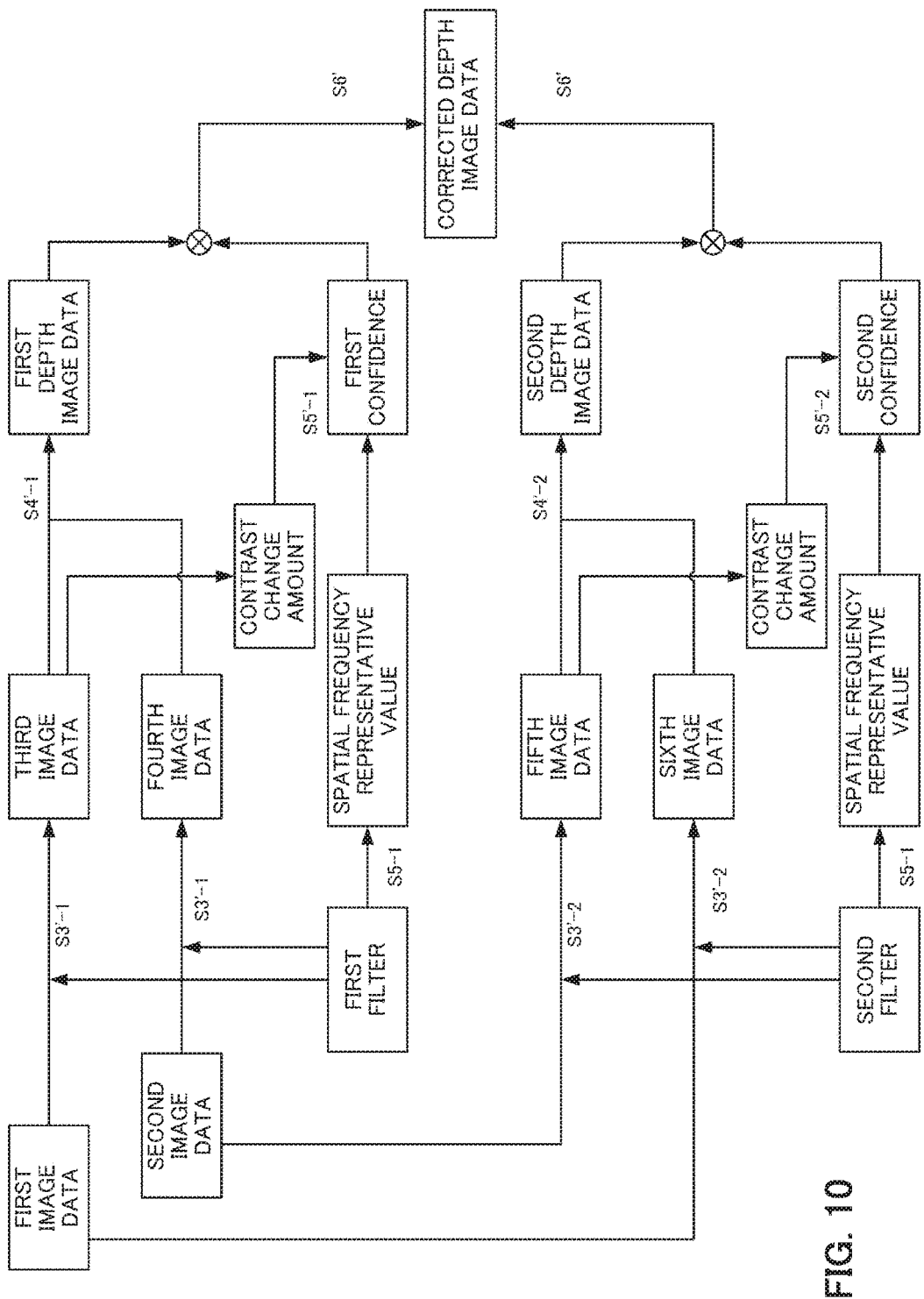
FIG. 10 is a data flow diagram for processing in a third embodiment.

The procedure for calculating a depth and confidence according to the embodiment will be described with reference to FIGS. 10, and 11A to 11D. FIG. 10 illustrates the flow of data in the procedure for calculating a depth and confidence according to the embodiment. FIG. 11A is a flowchart for illustrating the procedure for calculating a depth and confidence. The procedure shown in FIG. 11A is carried out by the arithmetic processor 102.

In step S1, the image reader 111 obtains first image data and second image data obtained by the image sensing device 101 and stored in the recording part 104.

In step S2, light quantity balance correction processing for correcting disproportion in the light quantity balance between the first image data and the second image data is carried out. The light quantity balance can be corrected by a known method.

Step S3' is a depth measuring image generation step, and an image for depth detection is generated from the first image data and the second image data. According to the embodiment, two image data pairs are generated from the first image data and the second image data. A first filter and a second filter having different spatial frequency characteristics are prepared for the purpose. The first filter and the second filter may be prerecorded for example in the recording part 104 and read out as required for use. In step S3'-1, the image generator 114 subjects the first image data and the second image data to the first filter and generates third image data and fourth image data. In step S3'-2, the image generator 114 subjects the first image data and the second image data to the second filter and generates fifth image data and sixth image data.

Here, the two filters may be two kinds of filters used for example when the average value of the provisional image shift amount has a large average value and a small average value according to the first embodiment.

The two filters to be applied may dynamically be changed. For example, three or more filters may be prepared, and two of the filters may be used selectively depending on the contents of images or photographing conditions.

Step S4' is a depth calculation step. In step S4'-1, the image shift amount acquirer 112 generates first depth image data on the basis of the third image data and the fourth image data. In step S4'-2, the depth calculator 115 generates second depth image data on the basis of the fifth image data and the sixth image data. The respective depth image data may be generated by the same method as that of the first embodiment. More specifically, the first depth image data is generated by calculating the depth to the object in a plurality of pixel positions while moving the attention point 410 set in the third image data. The second depth image data is generated by calculating the depth to the object in a plurality of pixels while moving the attention point 410 set in the fifth image data.

Step S5' is a confidence determination step, and confidence is calculated for the first depth image data and the second depth image data. The respective confidence values are calculated by the same method as that of the first embodiment. More specifically, in step S5'-1, the representative value acquirer 116 calculates a representative value of spatial frequencies by the first filter used in step S3, and the contrast change acquirer 117 calculates a contrast change amount from the third image data. The confidence determiner 118 generates first confidence image data corresponding to the first depth image data using the representative value and the contrast change amount. In step S5'-2, the representative value acquirer 116 calculates a representative value of spatial frequencies by the second filter, and the contrast change acquirer 117 calculates a contrast change amount from the fifth image data. The confidence determiner 118 generates second confidence image data corresponding to the second depth image data using the representative value and the contrast change amount. The confidence image data is generated by calculating confidence for depths in a plurality of pixel positions while moving the attention point 410 on the third image data or the fifth image data similarly to step S4'.

Step S6' is a depth correction step, and the depth corrector 119 calculates a corrected depth on the basis of the first depth image data, the second depth image data, the first confidence image data, and the second confidence image data.

The depth corrector 119 sets an attention point on image data and obtains confidence data and depth data corresponding to the pixel in the attention point from the confidence image data and depth image data. The depth corrector 119 calculates corrected image data by weighted-averaging the first depth image data and the second depth image data on the basis of the values of the first confidence and the second confidence. Correction depth image data is generated by obtaining depth data in a plurality of pixels while moving the attention point on the image data.

In the depth detection procedure according to the embodiment, in step S6', the corrected depth image data is calculated by weighted-averaging the depth image data on the basis of a plurality of confidence datapieces. In this way, the depth image data can be smoothed while the ratio of the region with smaller calculation errors is increased. As a result, the calculated corrected depth can be a highly accurate object depth.

Note that the correction of the depth image does not have to be carried out by weighted averaging, and the corrected depth image maybe generated by selecting the depth image data with higher confidence between the first confidence image data and the second confidence image data.

In the description of the embodiments, the first filter and the second filter are used by way of illustration, but the embodiment is not limited thereto. Using more filters, a plurality of depth measuring images may be generated, depth image data and confidence image data may be generated for each of the depth measuring images, and a corrected depth image may be generated accordingly. Depth data can be calculated on the basis of images obtained with more appropriate filters in each region in the image, and a corrected depth may be calculated on the basis of the confidence, so that a depth image with even higher accuracy can be generated.

According to the embodiment, the depth detection step in step S4' is followed by the confidence determination step in step S5' as shown in FIG. 11A. However, the depth detection step in step S4' may be carried out after the confidence determination step in step S5'. As step S5' is carried out before step S4', confidence may be obtained in advance. Image data for depth detection may be selected in the depth detection step in step S5' on the basis of the obtained confidence and the depth may be detected. In this way, the step of detecting a depth with low confidence may be omitted, so that a depth image can be generated at high speed. Depth calculation conditions (such as the size of the comparison region 420 and a search range for a corresponding point) may be set depending on the confidence similarly to the first embodiment. In this way, the depth to the object can be detected with even higher accuracy.

Other Embodiments

In the description of the embodiments, the depth to the object is calculated by way of illustration but the present invention may be applied to an image shift amount detection apparatus that detects an image shift amount. For example, in such an image shift amount detection apparatus, processing such as cutting the part of the subject in the vicinity of the in-focus position from the image may be carried out. The image shift amount detection apparatus may be configured to directly output the image shift amount in the depth detection apparatus 110 according to the first embodiment without converting the image shift amount into a depth, and then the other configuration may be the same as that of the depth detection apparatus 110.

Alternatively, the present invention may be implemented as a depth information detection apparatus that detects depth information represented in an arbitrary form. The depth information is a value corresponding to the distance between a certain reference point and the object. Typically, the distance (absolute distance) between the depth information detection apparatus and the object corresponds to the depth information. In general, the depth information may be any of other values that can be determined from the distance between an image capturing apparatus and the object. Other examples of the depth information include the distance between the focus position of a single image and the object and the distance between the intermediate position between the focus positions of two images and the object. The depth information may be either about the distance on the image plane side or the distance on the object side. The depth information may be represented by a distance in a real space or an amount such as a defocus amount and a parallax amount (image shift amount) that can be converted into a real space distance. In this way, the depth information is a value that changes depending on the distance (absolute distance) between the image capturing apparatus and the object. Therefore, the depth information may be referred to as a distance dependent value.

The present invention includes a computer program in addition to the depth detection apparatus or the image shift amount detection apparatus. The computer program according to the embodiment causes the computer to execute prescribed steps of calculating a depth or an image shift amount and confidence. The program according to the embodiment is installed in a computer in an image capturing apparatus, such as a digital camera, including a depth detection apparatus and/or an image shift amount detection apparatus. When the installed program is executed on the computer, the above described functions are implemented, so that highly accurate depth detection and image shift amount detection can be carried out at high speed.

The present invention can be implemented by supplying, through a network or a storage medium, a system or a device with a program that implements one or more of the functions according to the embodiments and reading out and executing the program by one or more processors in a computer in the system or the device. The present invention can be implemented by a circuit (such as ASIC) that implements one or more of the functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-207805, filed on Oct. 24, 2016, which is hereby incorporated by reference herein in its entirety.

What is claimed is:

1. A depth detection apparatus for detecting depth information from a first image and a second image based on a light flux passing through different pupil regions of an image forming optical system, the depth detection apparatus comprising:
   an image generator configured to generate a third image and a fourth image by subjecting the first image and the second image to a filter;
   a depth detector configured to detect depth information on the basis of a relative positional shift amount between the third image and the fourth image;
   a representative value acquirer configured to acquire a representative value of spatial frequencies of the third image or the fourth image on the basis of a frequency characteristic of the filter; and
   a confidence determiner configured to determine confidence for the depth information on the basis of the representative value,
   the confidence being determined as a value representing higher confidence as the representative value is greater.

2. The depth detection apparatus according to claim 1, wherein the confidence is determined on the basis of the representative value and an evaluation value that is obtained by evaluating a contrast change amount in the third image or the fourth image.

3. The depth detection apparatus according to claim 2, wherein the confidence is a product of the evaluation value and a square of the representative value or a value based on the product.

4. The depth detection apparatus according to claim 3, further comprising a shift amount acquirer configured to evaluate a degree of correlation between the third image and the fourth image using a sum of squares of pixel value differences between the third image and the fourth image, and acquire the relative positional shift amount between the third image and the fourth image on the basis of the degree of correlation.

5. The depth detection apparatus according to claim 3, further comprising an image shift amount acquirer configured to evaluate a degree of correlation between the third image and the fourth image using a cross-correlation function between the third image and the fourth image, and acquire the relative positional shift amount between the third image and the fourth image on the basis of the degree of correlation.

6. The depth detection apparatus according to claim 2, wherein the confidence is a product of the evaluation value and the representative value or a value based on the product.

7. The depth detection apparatus according to claim 6, further comprising an image shift amount acquirer configured to evaluate a degree of correlation between the third image and the fourth image using a sum of absolute values of pixel value differences between the third image and the fourth image, and acquire the relative positional shift amount between the third image and the fourth image on the basis of the degree of correlation.

8. The depth detection apparatus according to claim 2, wherein the evaluation value is a variance of a pixel value of the third image or the fourth image.

9. The depth detection apparatus according to claim 1, wherein the filter is generated on the basis of a relative positional shift amount between the first image and the second image.

10. The depth detection apparatus according to claim 1, comprising a recording part that records a plurality of filters corresponding to the positional shift amounts, wherein a filter for the first image and a filter for the second image are read out from the recording part on the basis of a relative positional shift amount between the first image and the second image.

11. The depth detection apparatus according to claim 1, wherein a filter for the first image and a filter for the second image are different filters.

12. The depth detection apparatus according to claim 1, wherein the representative value is a spatial frequency having a maximum gain in a spatial frequency characteristic of the filter, a spatial frequency obtained by weighted-averaging spatial frequencies in the spatial frequency characteristic by a gain, or a maximum spatial frequency of spatial frequencies having a gain equal to or higher than a prescribed threshold in the spatial frequency characteristic.

13. The depth detection apparatus according to claim 1, comprising a recording part that records a representative value corresponding to the positional shift amount, wherein the representative value acquirer is configured to acquire a representative value corresponding to the positional shift amount from the recording part.

14. The depth detection apparatus according to claim 1, wherein the representative value is a representative value of spatial frequencies in a direction connecting gravity centers of different pupil regions of the image forming optical system.

15. The depth detection apparatus according to claim 1, wherein the depth detector is configured to set a parameter to be used in detecting the object depth, on the basis of the confidence determined by the confidence determiner.

16. The depth detection apparatus according to claim 1, further comprising a corrector configured to correct the depth information detected by the depth detector on the basis of the confidence.

17. The depth detection apparatus according to claim 1, wherein the image generator is configured to further subject the first image and the second image to a second filter different from the filter, and generate a fifth image and a sixth image,
   the depth detector is configured to further detect second depth information on the basis of a positional shift amount between the fifth image and sixth image,
   the representative value acquirer is configured to further acquire a second representative value as a representative value of spatial frequencies of the fifth image or the sixth image on the basis of a frequency characteristic of the second filter,
   the confidence determiner is configured to further determine second confidence as confidence for the second depth information on the basis of the second representative value, and
   the depth detection apparatus further comprises a corrector configured to generate corrected depth information on the basis of the depth information, the confidence, the second depth information, and the second confidence.

18. A depth detection apparatus for detecting depth information from two images based on a light flux passing through different pupil regions of an image forming optical system, the depth detection apparatus comprising:
a depth detector configured to detect the depth information on the basis of the two images;
a representative value acquirer configured to acquire a representative value of spatial frequencies in one of the two images; and
a confidence determiner configured to determine confidence for the depth information on the basis of the representative value,
the confidence being determined as a value representing higher confidence as the representative value is greater.

19. A depth detection method carried out by a depth detection apparatus for detecting depth information from a first image and a second image based on a light flux passing through different pupil regions of an image forming optical system, the depth detection method comprising the steps of:
generating a third image and a fourth image by subjecting the first image and the second image to a filter;
detecting depth information on the basis of a positional shift amount between the third image and the fourth image;
acquiring a representative value of spatial frequencies of the third image or the fourth image on the basis of a frequency characteristic of the filter; and
determining confidence for the depth information on the basis of the representative value,
the confidence being determined as a value representing higher confidence as the representative value is greater.

20. A depth detection method carried out by a depth detection apparatus for detecting depth information from two images based on a light flux passing through different pupil regions of an image forming optical system, the depth detection method comprising the steps of:
detecting depth information on the basis of the two images;
acquiring a representative value of spatial frequencies in one of the two images; and
determining confidence for the depth information on the basis of the representative value,
the confidence being determined as a value representing higher confidence as the representative value is greater.

* * * * *